(12) United States Patent
Koyabu et al.

(10) Patent No.: US 7,848,610 B2
(45) Date of Patent: Dec. 7, 2010

(54) DATA PROCESSING SYSTEM, REPRODUCTION APPARATUS, COMPUTER, REPRODUCTION METHOD, PROGRAM, AND STORAGE MEDIUM

(75) Inventors: Kyohei Koyabu, Kanagawa (JP); Shojiro Shibata, Kanagawa (JP); Shuji Tsunashima, Tokyo (JP); Mototsugu Takamura, Kanagawa (JP); Shinjiro Kakita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1441 days.

(21) Appl. No.: 11/255,878

(22) Filed: Oct. 24, 2005

(65) Prior Publication Data

US 2006/0093321 A1    May 4, 2006

(30) Foreign Application Priority Data

Oct. 26, 2004    (JP) .......................... P2004-311593
Aug. 24, 2005    (JP) .......................... P2005-243289

(51) Int. Cl.
*H04N 5/91*    (2006.01)
*H04N 5/00*    (2006.01)

(52) U.S. Cl. ........................................ 386/46; 386/125
(58) Field of Classification Search .................... 386/46
See application file for complete search history.

(56) References Cited

U.S. PATENT DOCUMENTS 6,201,927 B1 * 3/2001 Comer ........................ 386/68

2002/0041714 A1 * 4/2002 Ishida et al. ................. 382/233
2002/0114610 A1 * 8/2002 Nakano et al. ................ 386/39

FOREIGN PATENT DOCUMENTS

| JP | 8-79702 | 3/1996 |
| JP | 9-327020 | 12/1997 |
| JP | 10-150635 | 6/1998 |
| JP | 11-313283 | 11/1999 |
| JP | 2000-83215 | 3/2000 |
| JP | 2002-218396 | 8/2002 |

OTHER PUBLICATIONS

U.S. Appl. No. 12/633,457, filed Dec. 8, 2009, Shibata, et al.

* cited by examiner

*Primary Examiner*—Marsha D Banks Harold
*Assistant Examiner*—Oluwaseun A Adegeye
(74) *Attorney, Agent, or Firm*—Oblon, Spivak, McClelland, Maier & Neustadt, L.L.P.

(57) ABSTRACT

A data processing system comprising a computer outputting to a reproduction apparatus data required for reproduction of a reproduction point in the reproduced data when receiving as input a first command designating a reproduction point of reproduced data and outputting to the reproduction apparatus a reproduction start command of the reproduction point when receiving as input a second command indicating the start of reproduction of the reproduction point designated by the first command after receiving as input the first command and a reproduction apparatus decoding data of the reproduction point based on the data input from the computer, storing the decoding result in a reproduction memory, and, when receiving as input the reproduction start command from the computer, reading, reproducing, and outputting the decoding results of the reproduction point from the reproduction memory.

16 Claims, 15 Drawing Sheets

US 7,848,610 B2

DATA PROCESSING SYSTEM, REPRODUCTION APPARATUS, COMPUTER, REPRODUCTION METHOD, PROGRAM, AND STORAGE MEDIUM

CROSS REFERENCES TO RELATED APPLICATIONS

The present invention contains subject matter related to Japanese Patent Application No. 2004-311593 filed in the Japan Patent Office on Oct. 26, 2004, and Japanese Patent Application No. 2005-243289 filed in the Japan Patent Office on Aug. 24, 2005, the entire contents of which being incorporated herein by reference.

BACKGROUND OF THE INVENTION

1. Field of the Invention

The present invention relates to a data processing system, reproduction apparatus, computer, reproduction method, program, and storage medium for reproducing reproduced data.

2. Description of the Related Art

For example, there are systems comprised of computers into the slots of which boards mounting MPEG (Moving Picture Experts Group) decoders or other reproduction apparatuses are inserted so that picture data stored in the computer HDD (Hard Disk Drive) may be decoded and reproduced in the reproduction apparatuses. In such a system, usually, the user designates a reproduction point (picture data) in the reproduced data stored in the HDD on the screen, then inputs a reproduction start command. In such a system of the related art, the computer reads out the picture data required for reproduction of the designated reproduction point from the HDD and outputs it to the reproduction apparatus after the user inputs the reproduction start command. For reference, see Japanese Patent Publication (A) No. 2001-78145.

However, in the above system of the related art, in the interval from when the user inputs a reproduction start command to when the reproduction apparatus outputs the picture of the reproduction point, processing for outputting the picture data from the computer to the reproduction apparatus, processing for decoding the picture data, and processing for reproducing the decoding results are required. There is therefore the disadvantage that a long time is taken and therefore the response is poor.

SUMMARY OF THE INVENTION

An object of the present invention is to provide a data processing system, reproduction apparatus, computer, reproduction method, program, and storage medium able to shorten, compared with the related art, the time from when a reproduction start command is input to when reproduction and output of a reproduction point are obtained when inputting the reproduction start command of a reproduction point after designating the reproduction point of the reproduced data.

According to a first aspect of the invention, there is provided a data processing system comprising a computer outputting to a reproduction apparatus data required for reproduction of a reproduction point in the reproduced data when receiving as input a first command designating a reproduction point of reproduced data and outputting to the reproduction apparatus a reproduction start command of the reproduction point when receiving as input a second command indicating the start of reproduction of the reproduction point designated by the first command after receiving as input the first command and a reproduction apparatus decoding data of the reproduction point based on the data input from the computer, storing the decoding result in a reproduction memory, and, when receiving as input the reproduction start command from the computer, reading, reproducing, and outputting the decoding results of the reproduction point from the reproduction memory.

The mode of operation of the first aspect of the invention is as follows: A computer outputs to a reproduction apparatus data required for reproduction of a reproduction point in reproduced data when receiving as input a first command designating a reproduction point of reproduced data. A reproduction apparatus decodes data of the reproduction point based on the data input from the computer. The computer outputs to the reproduction apparatus a reproduction start command of the reproduction point when receiving as input a second command indicating the start of reproduction of the reproduction point designated by the first command after receiving as input the first command. The reproduction apparatus decodes reads, reproduces, and outputs the decoding results of the reproduction point from the reproduction memory.

According to a second aspect of the invention, there is provided a reproduction apparatus comprising an input memory storing data required for reproduction of a reproduction point in reproduced data, a reproduction memory, and a decoder decoding the reproduction point based on data required for reproduction of the reproduction point read from the input memory, writing the decoding results in the reproduction memory, and reading and reproducing and outputting decoding results of the reproduction point stored in the reproduction memory based on an input reproduction start command indicating the reproduction point.

The mode of operation of the second aspect of the invention is as follows: The decoder decodes the reproduction point based on data required for reproduction of the reproduction point read from the input memory and writes the decoding results in the reproduction memory. After this, when receiving as input a reproduction start command indicating the reproduction point, it reads and reproduces and outputs decoding results of the reproduction point.

According to a third aspect of the invention, there is provided a computer making a reproduction apparatus decode and reproduce reproduced data, comprising an inputting means for inputting a first command designating a reproduction point of reproduced data and a second command indicating start of reproduction of the reproduction point designated by the first command after inputting the first command and a processing circuit making the reproduction apparatus output and decode data required for reproduction of the reproduction point in the reproduced data when the first command is input and outputting a reproduction start command to the reproduction apparatus and making it reproduce and output the decoding results when the second command is input.

According to a fourth aspect of the invention, there is provided a reproduction method comprising a first step of having a computer output to a reproduction apparatus the data required for reproduction of a reproduction point in reproduced data when inputting a first command designating the reproduction point of the reproduced data, a second step of having the reproduction apparatus decode data of the reproduction point based on the data input from the computer at the first step and store the decoding results in a reproduction memory, a third step of having the computer output a reproduction start command of the reproduction point to the reproduction apparatus when inputting a second command indicating the start of reproduction of the reproduction point designated by the first command after inputting the first command, and a fourth step of having the reproduction apparatus read and reproduce and output the decoding results of the reproduction point from the reproduction memory based on the reproduction start command input at the third step.

According to a fifth aspect of the invention, there is provided a reproduction method performed by a reproduction apparatus provided with an input memory for storing data required for production of a reproduction point in reproduced data and a reproduction memory, comprising a first step of writing the input data into the input memory, a second step of reading the data input at the first step from the input memory, decoding the reproduction point, and writing the decoding results in the reproduction memory, and a third step of reading and reproducing and outputting the decoding results of the reproduction point written in the reproduction memory at the second step based on the input reproduction start command indicating the reproduction point.

According to a sixth aspect of the invention, there is provided a program executed by a computer, comprising a first routine of having a computer output to a reproduction apparatus the data required for reproduction of a reproduction point in reproduced data when inputting a first command designating the reproduction point of the reproduced data, a second routine of having the reproduction apparatus decode data of the reproduction point based on the data input from the computer at the first routine and store the decoding results in a reproduction memory, and a third routine of having the computer output a reproduction start command of the reproduction point to the reproduction apparatus when inputting a second command indicating the start of reproduction of the reproduction point designated by the first command after inputting the first command.

According to a seventh aspect of the invention, there is provided a storage medium storing a program executed by a computer, the program comprising a first routine of having a computer output to a reproduction apparatus the data required for reproduction of a reproduction point in reproduced data when inputting a first command designating the reproduction point of the reproduced data, a second routine of having the reproduction apparatus decode data of the reproduction point based on the data input from the computer at the first routine and store the decoding results in a reproduction memory, and a third routine of having the computer output a reproduction start command of the reproduction point to the reproduction apparatus when inputting a second command indicating the start of reproduction of the reproduction point designated by the first command after inputting the first command.

According to an eighth aspect of the invention, there is provided a program executed by a reproduction apparatus provided with an input memory for storing data required for production of a reproduction point in reproduced data and a reproduction memory, comprising a first routine of writing the input data into the input memory, a second routine of reading the data input at the first routine from the input memory, decoding the reproduction point, and writing the decoding results in the reproduction memory, and a third routine of reading and reproducing and outputting the decoding results of the reproduction point written in the reproduction memory at the second routine based on the input reproduction start command indicating the reproduction point.

According to a ninth aspect of the invention, there is provided a storage medium storing a program executed by a reproduction apparatus provided with an input memory for storing data required for production of a reproduction point in reproduced data and a reproduction memory, the program comprising a first routine of writing the input data into the input memory, a second routine of reading the data input at the first routine from the input memory, decoding the reproduction point, and writing the decoding results in the reproduction memory, and a third routine of reading and reproducing and outputting the decoding results of the reproduction point written in the reproduction memory at the second routine based on the input reproduction start command indicating the reproduction point.

According to a 10th aspect of the invention, there is provided a data processing apparatus outputting to a reproduction apparatus data required for reproduction of a reproduction point in reproduced data when receiving as input a first command designating the reproduction point of the reproduced data and outputting to the reproduction apparatus a reproduction start command for the reproduction point when receiving as input a second command indicating a start of reproduction of the reproduction point designated by the first command after receiving as input the first command.

According to the present invention, it is possible to provide a data processing system, reproduction apparatus, computer, reproduction method, program, and storage medium able to shorten, compared with the related art, the time from when a reproduction start command is output to when a reproduction point is reproduced and output in the case of designating the reproduction point of reproduced data, then outputting a reproduction rate command of the reproduction point.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

First Embodiment

Below, the data processing system according to the first embodiment of the present invention will be explained.

Figure 1:
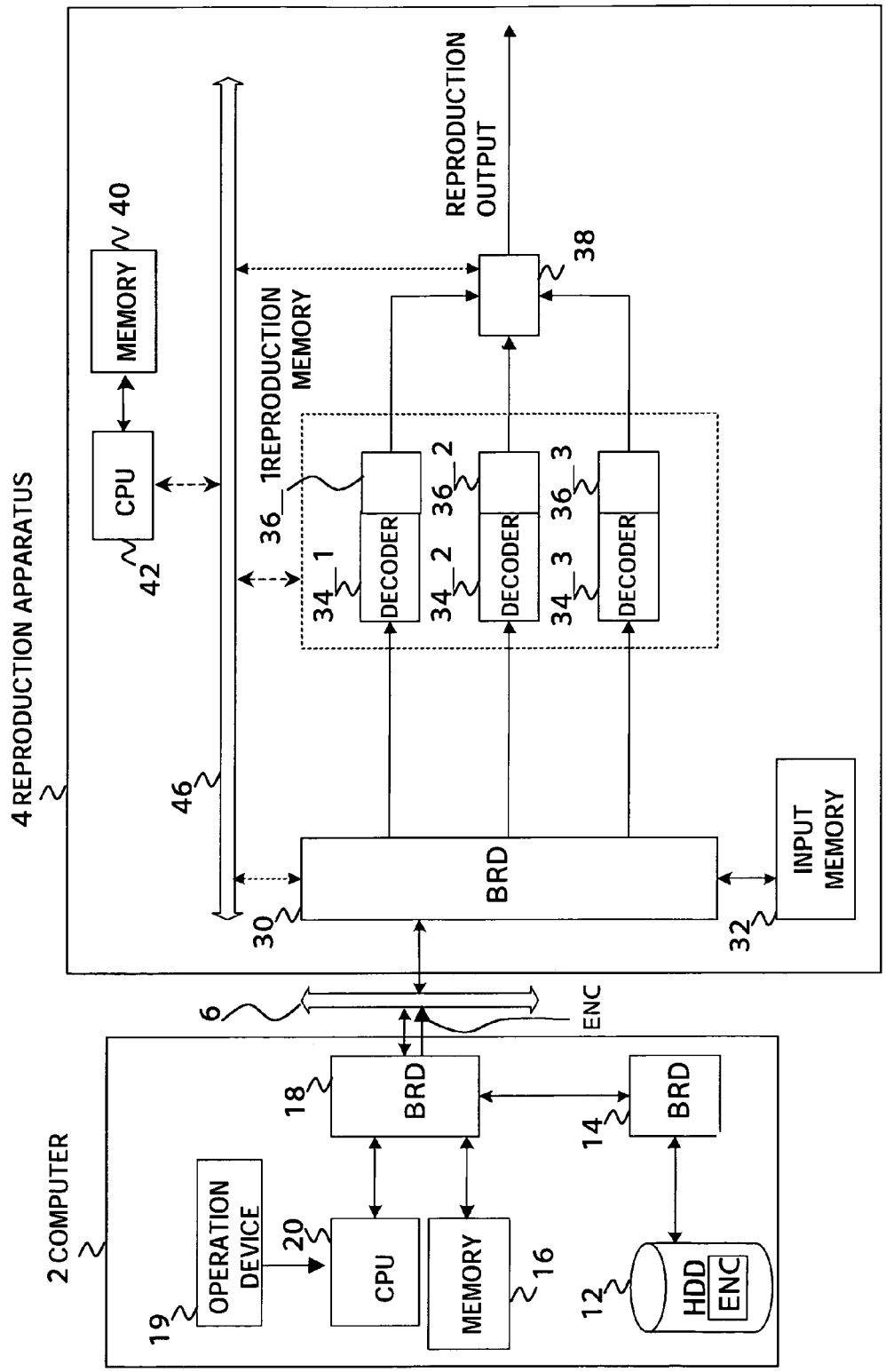
FIG. 1 is a view of the overall configuration of a data processing system according to a first embodiment of the present invention.

FIG. 1 is a view of the overall configuration of a data processing system 1 according to an embodiment of the present invention. As shown in FIG. 1, the data processing system 1, for example, has a computer 2 and a reproduction apparatus 4.

[Computer 2]

Figure 2:
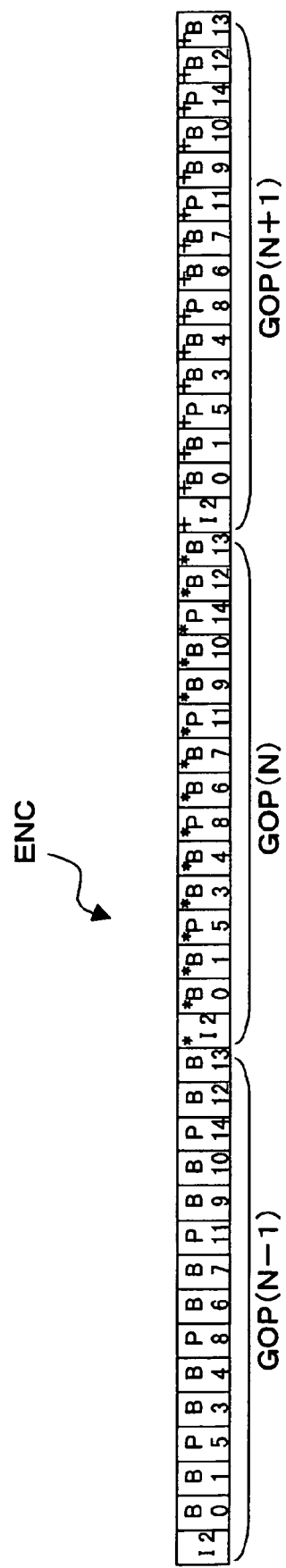
FIG. 2 is a view for explaining reproduced data ENC to be decoded by the data processing system shown in FIG. 1.

As shown in FIG. 1, the computer 2 has an HDD 12, a bridge 14, a memory 16, a bridge 18, operation device 19, and a CPU 20. Note that, the control memory 16 stores a predetermined program (program of the sixth aspect of the present invention), while the CPU 20 reads out and executes the program to perform the following processing. The predetermined program may be stored in a semiconductor memory or other memory 16 or stored on an HDD, optical disk, or other storage medium. The HDD 12 for example stores reproduced data ENC encoded by the MPEG scheme. The reproduced data ENC, as shown in FIG. 2, is comprised of a plurality of GOP (groups of pictures) successively decoded in order at the reproduction apparatus 4. In the example shown in FIG. 2, it is decoded in the order of GOP(N−1), (N), (N+1), (N+2). Each GOP is comprised of I, P, and B, that is, three types of, picture data (frame data). Further, each GOP includes a single I picture data. In the present embodiment, for example, a so-called "long GOP" with a relatively large number of picture data in the GOP is used.

Here, the I picture data is picture data of an intra-(in-frame) encoded image and is decoded independently from other picture data. Further, the P picture data is picture data of the frame predictively encoded in the forward direction and is decoded with reference to the I or P picture data positioned time-wise in the past (previous display order). Note that the "I and P picture data" is also referred to as the "anchor picture data". Further, the B picture data is picture data of the frame predictively encoded in two directions and is decoded while referring to the I or P picture data positioned time-wise in front or in back (display order in front or back). Note that the read rate of the HDD 12 is slower than the maximum reproduction rate of the reproduction apparatus 4.

The bridge 14 provides an expansion function of the bridge 18 and is provided with a PCI expansion slot or IDE (Integrated Drive Electronics) slot etc. The bridge 14 basically has the same functions as the bridge 18, but has a narrower bandwidth than the bridge 18 and has lower speed access devices than the devices connected to the bridge 18 connected to it.

The memory 16 is for example a semiconductor memory and stores the programs and data used for the processing by the CPU 20. The operation device 19 is a keyboard, mouse, or other operating means and outputs an operation signal corresponding to user operations to the CPU 20. The operation device 19 receives an operation for designating a reproduction point of the reproduced data ENC and an operation for issuing a reproduction start command of the designated reproduction point in accordance with the operation of the user based on a not shown operation screen and outputs an operation signal showing the same to the CPU 20. The bridge 18 has the bridge 14, memory 16, PCI bus 6, and CPU 20 connected to it and converts data along with transfer through the CPU 20 address bus and data bus.

The CPU 20, for example, executes a program read from the memory 16 to centrally control the operation of the computer 2. When the CPU 20 receives as input an operation signal from the operation device 19 indicating the operation for designating a reproduction point, it reads the GOP including the picture data of the designated reproduction point from the HDD 12 and outputs it through the bridge 18 and PCI bus 6 to the reproduction apparatus 4. Further, when the CPU 20 receives as input an operation signal indicating a reproduction start command operation from the operation device 19, it outputs a reproduction start command designating a reproduction point through the bridge 18 and PCI bus 6 to the reproduction apparatus 4. Further, the CPU 20 outputs GOPs to the reproduction apparatus 4 so that a GOP one position in display order before the GOP including picture data of the reproduction point in the reproduction apparatus 4 in the GOPs in the reproduced data ENC and a GOP one position in display order after it are stored in the input memory 32 of the reproduction apparatus 4.

[Reproduction Apparatus 4]

As shown in FIG. 1, the reproduction apparatus 4, for example, has a PCI bridge 30, an input memory 32, decoders 34_1 to 34_3, reproduction memories 36_1 to 36_3, a selector 38, a control memory 40, a CPU 42, and a control bus 46. Note that the control memory 40 stores a predetermined program (program of the present invention) and the CPU 42 reads and executes that program to perform the following processing. The predetermined program may be stored in a semiconductor memory or other control memory 40 or may be stored on an HDD, optical disk, or other storage medium.

The PCI bridge 30 is provided with a memory for buffering the GOPs and commands input via the PCI bus 6 from the computer 2. Further, the bridge 18 is provided with a dynamic memory access (DMA) transfer function. The input memory 32 is an SDRAM or other semiconductor memory and temporarily stores GOPs input via the PCI bridge 30.

The decoder 34_1, in accordance with the control of the CPU 42, receives as input the reproduced data ENC read from the input memory 32 through the PCI bridge 30, decodes it by the MPEG scheme, and writes the results into the reproduction memory 36_1. Specifically, the decoder 34_1, under the control of the CPU 42, decodes the I picture data read from the input memory 32 without referring to the decoding results of other picture data. Further, the decoder 34_1, under the control of the CPU 42, decodes the P picture data in the GOP read from the input memory 32 by referring to the decoding results of the I or P picture data positioned time-wise in the past and already decoded. Further, the decoder 34_1, under the control of the CPU 42, decodes the B picture data in the GOP read from the input memory 32 by referring to the decoding results of the I or P picture data positioned time-wise in front or in back and already decoded. The decoders 34_2 and 34_3 have the same configuration as that of the decoder 34_1, decode the picture data input via the PCI bridge 30 by the MPEG scheme, and write the same into the reproduction memories 36_2 and 36_3.

Figure 3:
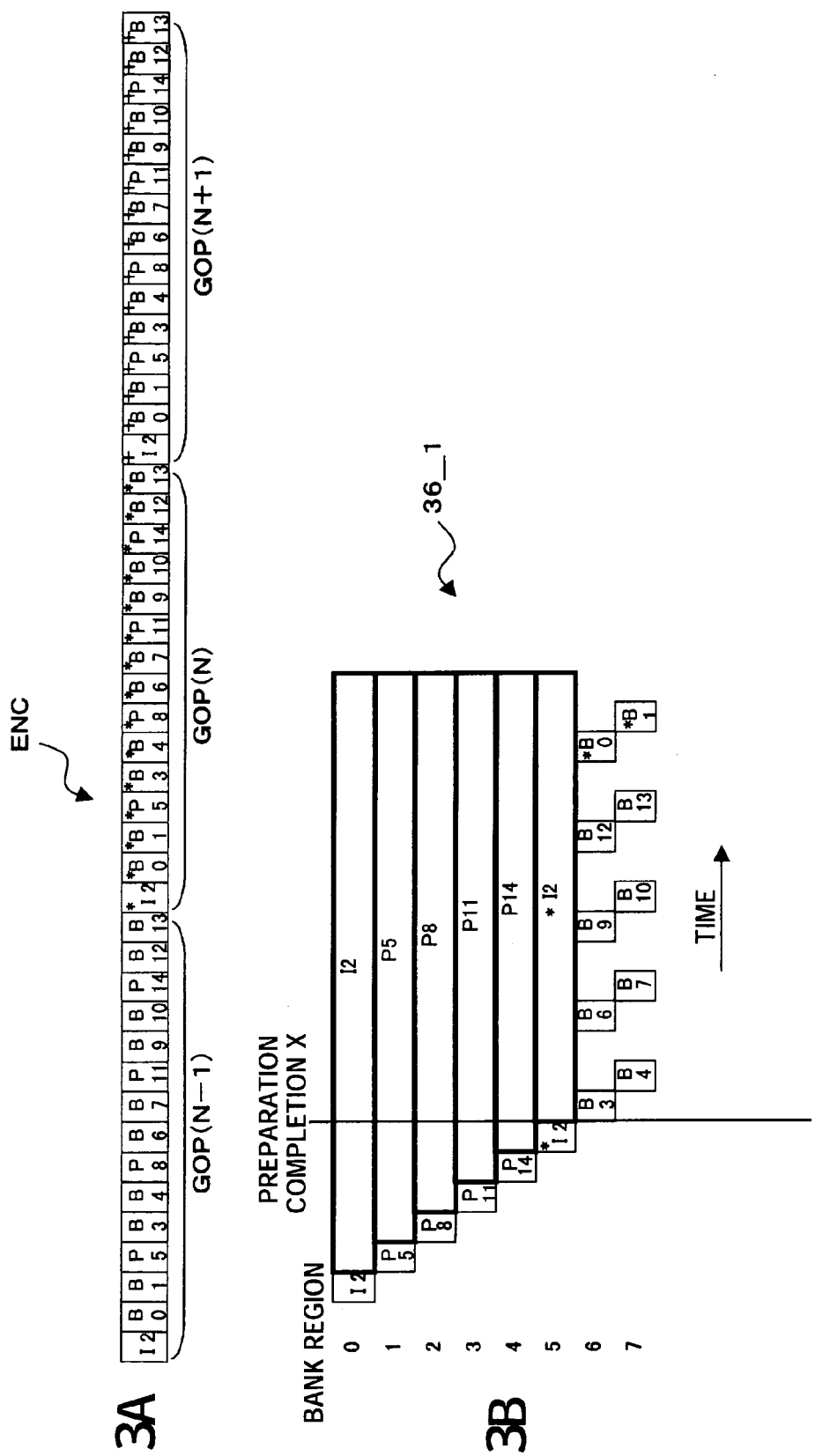
FIG. 3A is a view of reproduced data ENC shown in FIG. 2.
FIG. 3B is a view for explaining a storage state of the reproduction memory 36-_1 shown in FIG. 1.

Below, a writing method of decoding results into the reproduction memories 36_1, 36_2, and 36_3 by the decoders 34_1, 34_2, and 34_3 will be explained. As shown in FIG. 3, each of the reproduction memories 36_1, 36_2, and 36_3 has eight bank regions "0" to "7". In the present embodiment, as shown in FIG. 3B and FIGS. 4A and 4B, among eight bank regions provided in each of the reproduction memories 36_1, 36_2, and 36_3, six bank regions "0" to "5" are used in a fixed manner as storage regions for storing decoding results of the I and P picture data, and two bank regions "6" and "7" are used in a fixed manner as storage regions for storing decoding results of the B picture data. When decoding the reproduced data ENC shown in FIG. 2 and FIG. 3A, the decoder 34_1 for example writes the picture data of I2, P5, P8, P11, and P14 in the GOP(N−1) and the I2 picture data in the GOP(N) in the bank regions "0" to "5" in the reproduction memory 36_1 as shown in FIG. 3B. Further, the decoder 34_2 for example writes the picture data of I2, P5, P8, P11, and P14 in the GOP(N) and the I2 picture data in the GOP(N+1) in the bank regions "0" to "5" in the reproduction memory 36_2 as shown in FIG. 4A. Further, the decoder 34_3 for example writes the picture data of I2, P5, P8, P11, and P14 in the GOP(N+1) and the I2 picture data in the GOP(N+2) in the bank regions "0" to "5" in the reproduction memory 36_3 as shown in FIG. 4B.

Further, the decoder 34_1 refers to decoding results of the I and P picture data stored in the bank regions "0" to "5" in the reproduction memory 36_1 when decoding the B picture data in the GOP (N−1).

Further, the decoder 34_2 refers to decoding results of the I and P picture data stored in the bank regions "0" to "5" in the reproduction memory 36_2 when decoding the B picture data in the GOP(N).

Further, the decoder 34_3 refers to decoding results of the I and P picture data stored in the bank regions "0" to "5" in the reproduction memory 36_3 when decoding the B picture data in the GOP(N+1).

The selector 38, under the control of the CPU 42, switches and selectively reproduces and outputs the decoding results read from the reproduction memories 36_1, 36_2, and 36_3.

The CPU 42 performs the following processing based on the program and data stored in the control memory 40 to centrally control the operation of the reproduction apparatus 4. The CPU 42 writes the GOP input from the computer 2 (reproduced data ENC) to the input memory 32. Further, the CPU 42 performs the scheduling for determining the order of decoding the picture data in that GOP in units of GOPs for the reproduced date ENC stored in the input memory 32. The CPU 42, for example reads the I and P picture data in the GOP(N−1) and the B picture data in the GOP(N) decoded with reference to decoding results of the I and P picture data via the PCI bridge 30 from the input memory 32 and outputs the same to the decoder 34_1. Here, in the present embodiment, the B picture data refers to an open GOP decoded with reference to decoding results of I and P picture data of different GOPs. Specifically, for example, B0 and B1 picture data in the GOP(N) shown in FIG. 3A are decoded with reference to decoding results of I and P picture data in the GOP(N−1). Accordingly, the CPU 42 outputs the B0 and B1 picture data in the GOP(N) to the decoder 34_1.

Further, the CPU 42 for example reads the I and P picture data in the GOP(N) and the B picture data in the GOP(N+1) decoded with reference to decoding results of the I and P picture data via the PCI bridge 30 from the input memory 32 and outputs them to the decoder 34_2. Further, the CPU 42 for example reads the I and P picture data in the GOP(N+1) and the B picture data in the GOP(N+2) decoded with reference to decoding results of the I and P picture data via the PCI bridge 30 from the input memory 32 and outputs them to the decoder 34_3.

Figure 4:
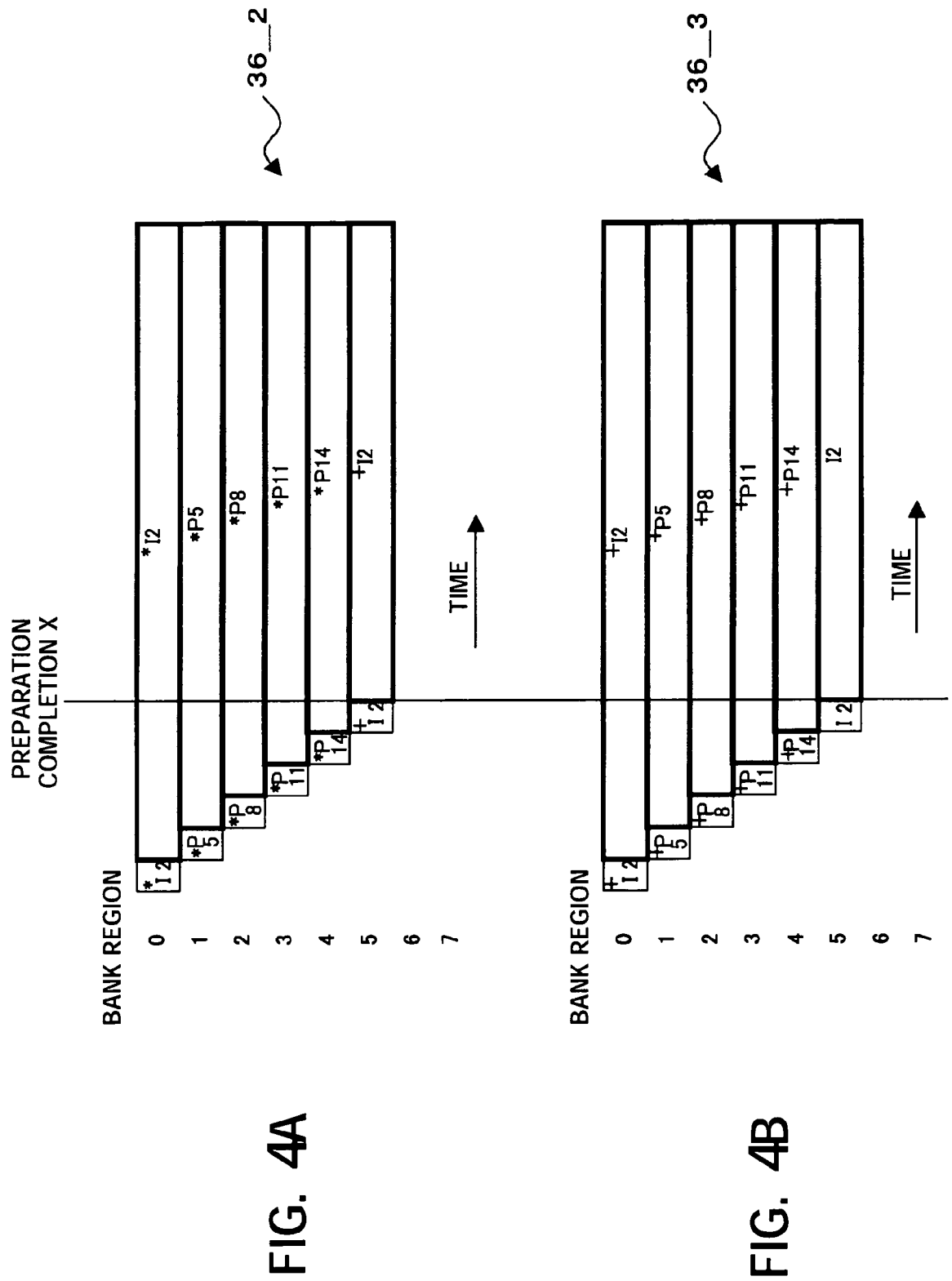
FIG. 4A is a view for explaining the storage state of a reproduction memory 36_2 shown in FIG. 1.
FIG. 4B is a view for explaining the storage state of a reproduction memory 36_23 shown in FIG. 1.

The CPU 42 for example makes the decoders 34_1, 34_2, and 34_3 perform the decoding up to a timing of preparation completion X shown in FIG. 3B and FIG. 4 before receiving the reproduction start command from the CPU 20 of the computer 2. As a result, at the timing of the CPU 42 receiving the reproduction start command from the CPU 20, decoding results of the I and P picture data of the GOP(N−1), GOP(N), and GOP(N+1) are stored in the reproduction memories 36_1 to 36_3. Further, when receiving the reproduction start command designating the reproduction point from the computer 2, the CPU 42 controls the decoding of the B picture data by the decoders 34_1, 34_2, and 34_3, the read operation from the reproduction memories 36_1, 36_2, and 36_3 to the selector 38, and the selection operation of the selector 38 so that the reproduction and output are carried out at a designated speed in a direction designated from the reproduction point.

Below, examples of the operation of the data processing system 1 shown in FIG. 1 will be explained.

First Example of Operation

Figure 5:
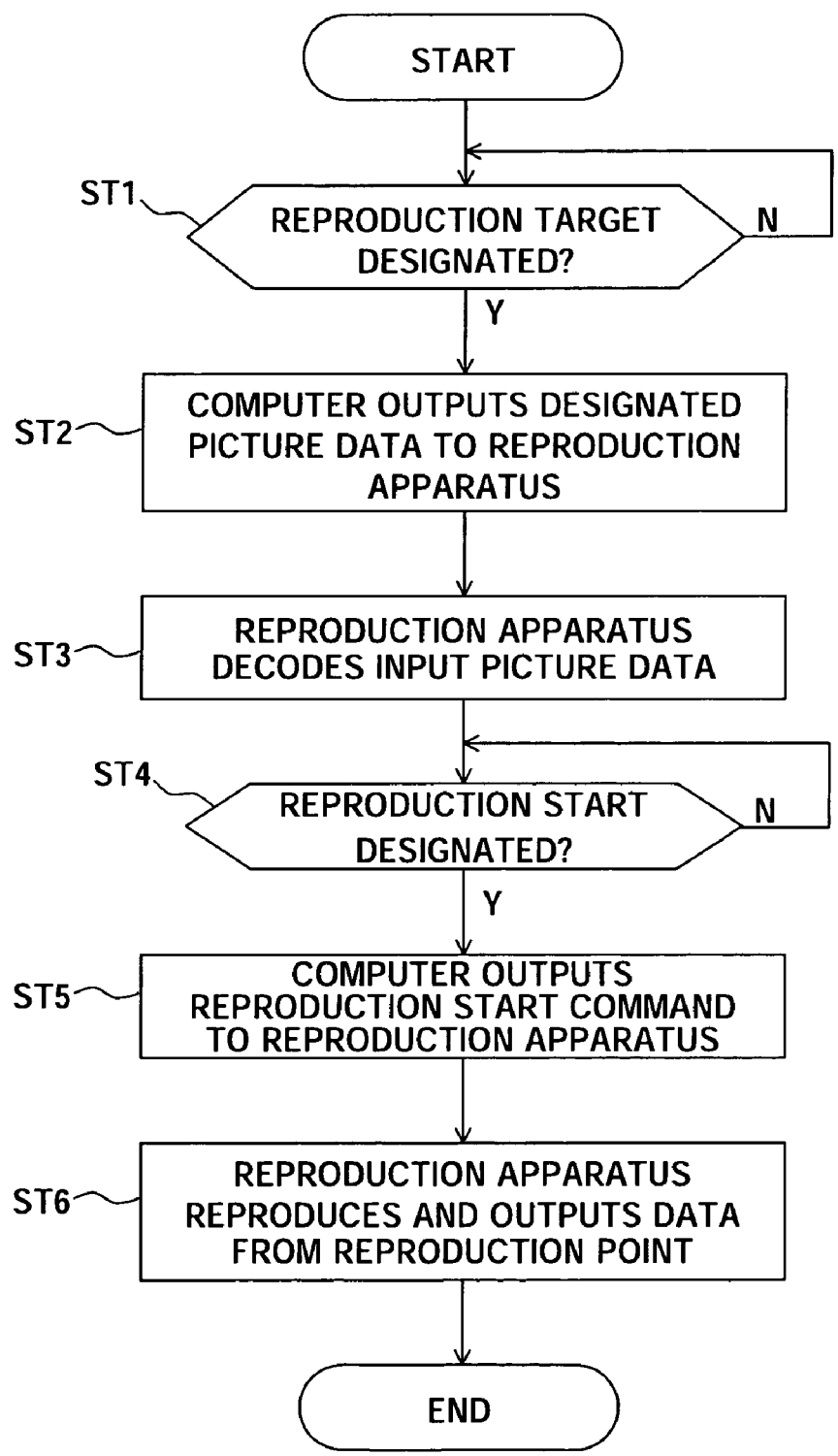
FIG. 5 is a flow chart for explaining an example of operation from when designating picture data for reproduction in a computer shown in FIG. 1 to when the data is reproduced and output at the reproduction apparatus.

Below, an example of the operation from when the picture data to be reproduced is designated by the computer 2 to when the reproduction and output are carried out at the reproduction apparatus 4 will be explained. FIG. 5 is a flow chart for explaining the example of the operation.

Step ST1:
The CPU 20 of the computer 2 judges if an operation signal indicating an operation for designation of a reproduction point in the reproduced data ENC has been input from the operation device 19. It proceeds to step ST2 when judging it has been designated, while repeats the processing of step ST1 when judging it has not.

Step ST2:
The CPU 20 of the computer 2 reads from the HDD 12 the GOP including the picture data of the reproduction point designated at step ST1 and the surrounding GOPs, i.e., a total of three (plurality of) GOPs, and outputs the same through the bridge 18 and the PCI bus 6 to the reproduction apparatus 4. The reproduction apparatus 4 writes the GOPs input from the computer 2 through the PCI bridge 30 into the input memory 32.

Step ST3:
The CPU 42 of the reproduction apparatus 4 performs the scheduling for determining the order of decoding the picture data in the GOP in units of GOPS for the reproduced data ENC stored in the input memory 32. Then, the CPU 42 reads the picture data included in the GOP stored in the input memory 32 and outputs it to the decoders 34_1, 34_2, and 34_3 as explained above by using for example FIG. 3 and FIG. 4 based on the results of the scheduling. Then, the decoders 34_1, 34_2, and 34_3 perform the decoding as explained above and write the decoding results in the reproduction memories 36_1, 36_2, and 36_3. Due to this, before the reproduction apparatus 4 receives the reproduction start command from the computer 2, as shown by the preparation completion in FIG. 3B and FIG. 4, decoding results of the I and P picture data of the GOP(N−1), GOP(N), and GOP(N+1) are stored in the reproduction memories 36_1 to 36_3.

The reproduction apparatus 4 can reproduce and output any picture data in the GOP to be processed when there is time for decoding the 1 picture's (1 frame's) worth of data after the writing by writing the decoding results of the I and P picture data in the fixed bank regions in the reproduction memories 36_1, 36_2, and 36_3. That is, the picture data of any designated reproduction point in the GOP at step ST6 explained later can be reproduced and output in the decoding time of 1 picture. For example, when decoding and reproducing and outputting the B9 picture data in the GOP(N−1), the decoding results of the P8 and P11 picture data in the GOP(N−1) are required. Further, in order to decode the P8 picture data, the decoding results of the P5 picture data are required, and in order to decode the P5 picture data, the decoding results of the I2 picture data are required.

That is, in order to decode the B9 picture data, decoding results of the I2, P5, P8, P11 picture data are required. According to the reproduction apparatus 4, as shown in FIG. 3B, by storing the I and P picture data in the reproduction memory 36_1, when the decoders 34_1 receive the B9 picture data of the GOP(N−1), the decoders 34_1 can quickly perform the processing of decoding and reproducing and outputting the B9 picture data by using the P8 and P11 picture data already stored in the bank regions "2" and "3" of the reproduction memory 36_1. The reproduction apparatus 4 shown in FIG. 1 is provided with three decoders 34_1, 34_2, and 34_3, therefore can reproduce and output three GOPs' worth of the picture data in the processing time of 1 picture data.

For example, since the reproduction apparatus 4 stores three GOPs' worth of the picture data shown in FIG. 3A in the input memory 32, when the CPU 20 of the computer 2 outputs a reproduction start command for defining the fifth picture (frame) of the GOP(N) as the reproduction point to the CPU 42 of the reproduction apparatus 4, it can quickly reproduce and output the image in accordance with the picture data at the fifth picture. Due to this, scrub reproduction and frame feed reproduction can be carried out in accordance with the reproduction start command from the computer 2 with a very good response. Further, the input memory 32 stores three GOPs' worth of the picture data, therefore, even when the reproduction point is changed over GOPs, a delay of the reproduction and output due to the transfer of the picture data from the computer 2 to the reproduction apparatus 4 and the decoding can be avoided.

Step ST4

The CPU 20 of the computer 2 judges if an operation signal indicating a reproduction start command operation designating a reproduction point has been input from the operation device 19. It proceeds to step ST5 when judging it has been input, while repeats the processing of step ST4 when judging it has not.

Step ST5:

The CPU 20 of the computer 2 outputs a reproduction start command designating a reproduction point to the reproduction apparatus 4.

Step ST6:

The CPU 42 of the reproduction apparatus 4 controls the decoding by the decoders 34_1, 34_2, and 34_3, the read operation from the reproduction memories 36_1, 36_2, and 36_3 to the selector 38, and the selection operation of the selector 38 so that the reproduction and output are carried out at a designated speed in a direction designated from the reproduction point indicated by the reproduction start command. Due to this, the reproduction apparatus 4 performs the reproduction and output from the reproduction point.

Second Example of Operation

Figure 6:
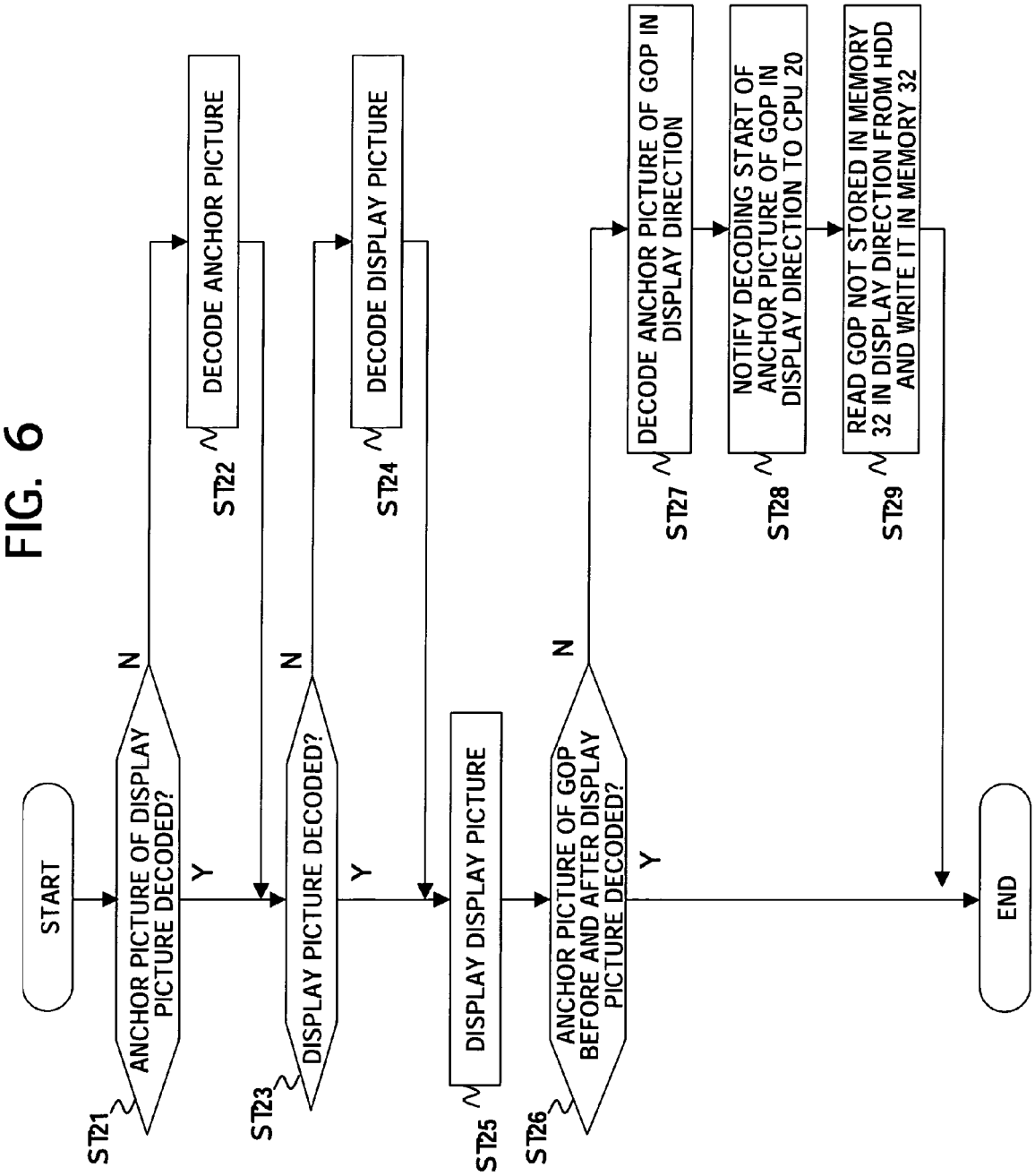
FIG. 6 is a flow chart for explaining a specific example of the operation at the time a reproduction apparatus shown in FIG. 1 reproduces and outputs picture data of the reproduction point.

Below, a specific example of the operation when the reproduction apparatus 4 reproduces and outputs the picture data at the reproduction point will be explained. Note that, here, this will be explained by illustrating the decoding at the decoder 34_1. FIG. 6 is a flow chart for explaining the example of operation.

Step ST21:

The CPU 42 of the reproduction apparatus 4 identifies the picture data to be reproduced and output next based on the reproduction point indicated by the reproduction start command input from the computer 2 and a state of progress of the reproduction. Then, the CPU 42 judges whether or not the anchor picture data of the identified picture data has been already decoded and stored in the reproduction memories 36_1, 36_2, and 36_3, proceeds to step ST23 when judging it has been stored, while if otherwise, it proceeds to step ST22. Note that, in the present embodiment, the anchor picture data is the picture data referring to the decoding results by the specified picture data to be decoded next.

Step ST22:

The CPU 42 reads the anchor picture data of the picture data identified at step ST21 from the input memory 32 to the decoders 34_1, 34_2 or 34_3 for decoding. Due to this, decoding results of the anchor picture data are stored in the reproduction memory 36_1, 36_2 or 36_3.

Step ST23:

The CPU 42 judges whether or not decoding results of the picture data identified at step ST21 are stored in the reproduction memory 36_1, 36_2 or 36_3, proceeds to step ST25 when judging they have been stored, while if otherwise, proceeds to step ST24.

Step ST24:

The decoder 34_1, 34_2, or 34_3 decodes the picture data identified at step ST21 by referring to the decoding results stored in the reproduction memory 36_1, 36_2, or 36_3 in accordance with need.

Step ST25:

The CPU 42 of the reproduction apparatus 4 makes the selector 38 select the decoding results of the picture data selected at step ST1 and reproduces and outputs it.

Step ST26:

The CPU 42 of the reproduction apparatus 4 judges whether or not decoding results of the I and P picture data constituting the anchor picture data of surrounding GOPs of the GOP to which the picture data selected at step STI belongs are stored in the reproduction memories 36_1, 36_2, and 36_3, ends the processing when judging they have been stored, while if otherwise, proceeds to step ST27.

Step ST27:

The CPU 42 of the reproduction apparatus 4 reads the anchor picture data of the GOP in the next display order with respect to the GOP to which the picture data selected at step STl belongs from the input memory 32 and outputs it to the decoders 34_1, 34_2, and 34_3.

Step ST28:

The CPU 42 of the reproduction apparatus 4 notifies the start of the decoding at step ST27 to the CPU 20 of the computer 2.

Step ST29:

The CPU 20 of the computer 2 reads the picture data which has not yet been stored in the input memory 32 in the picture data belonging to the GOP started being decoded at step ST28 from the HDD 12, outputs it to the reproduction apparatus 4, and makes that write it in the input memory 32.

Figure 7:
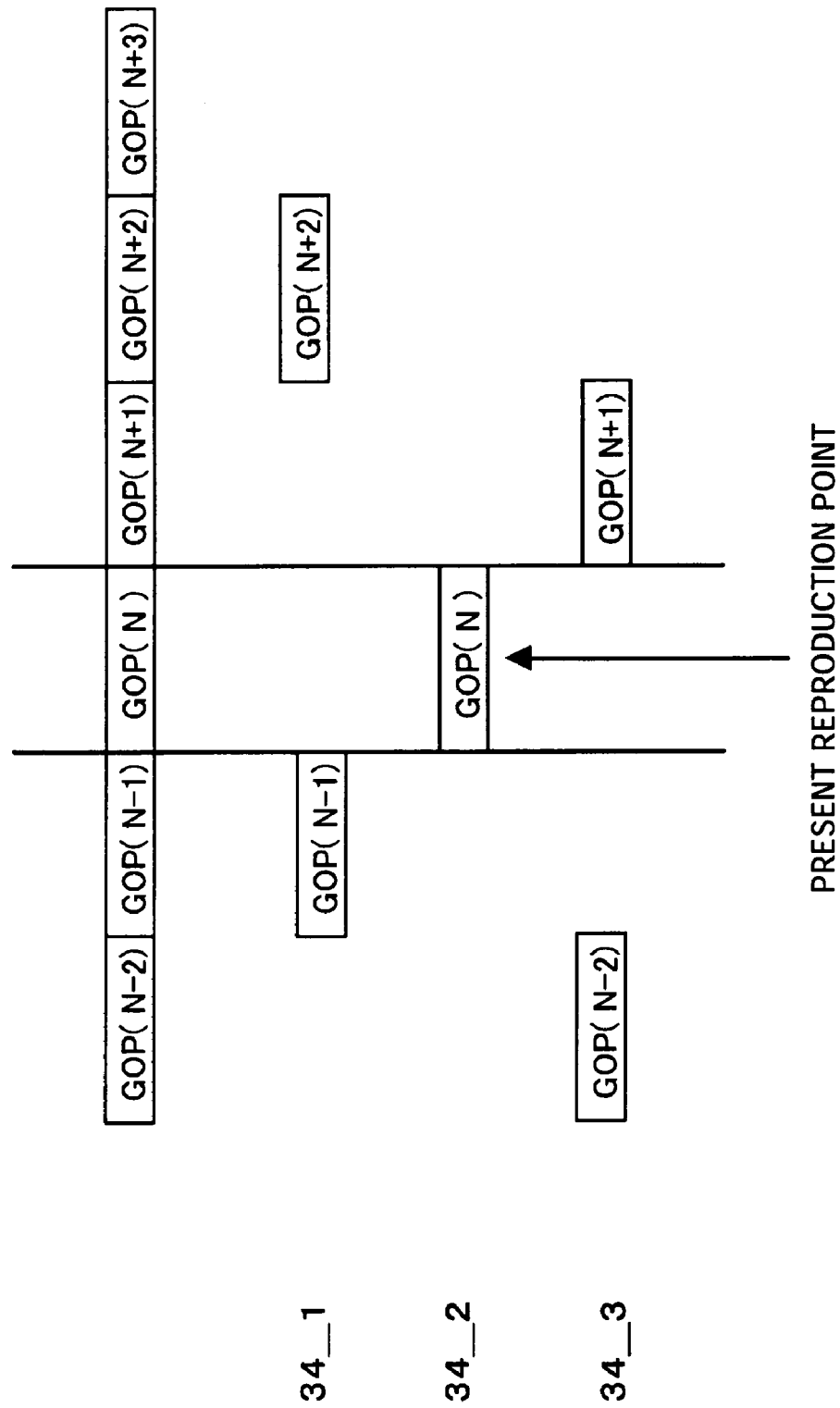
FIG. 7 is a view for explaining reproduction timing in a reproduction apparatus shown in FIG. 1.

Note that, in the data processing system 1, after the preparation completion point X shown in FIG. 3 and FIG. 4, for example, as shown in FIG. 7, when the reproduction point is changed in the picture data belonging to the GOP(N−1), GOP(N), and GOP(N+1) in the reproduction of the picture data belonging to the GOP(N) based on decoding results of the GOP(N) by the decoder 34_2, the reproduction and output can be carried out in the time for processing 1 picture data. However, for the picture data belonging to the GOP apart from the GOP(N) by 2 GOPs or more, for example GOP(N−2) and GOP(N+2), the decoding results of the anchor picture data are not stored in the reproduction memories 36_1, 36_2, and 36_3, therefore the reproduction and output cannot be carried out until the transfer from the computer 2 to the reproduction apparatus 4 and the decoding have finished.

As explained above, in the data processing system 1, when the reproduction point is designated in accordance with the operation of the operation device 19 of the computer 2 by the user, the GOP including the picture data of the reproduction point designated by the computer 2 is output to the reproduction apparatus 4. Then, the reproduction apparatus 4 automatically decodes the GOP input from the computer 2 in the decoders 34_1, 34_2, and 34_4 and writes the decoding results in the reproduction memories 36_1, 36_2, and 36_3. Thereafter, when the reproduction start command is input in accordance with the operation of the operation device 19 of the computer 2 by the user, the computer 2 outputs the reproduction start command to the reproduction apparatus 4, and the reproduction apparatus 4 performs the reproduction and output in accordance with the reproduction point based on the decoding results stored in the reproduction memories 36_1, 36_2, and 36_3. Due to this, the time from when inputting the reproduction start command to when the reproduction and output of the designated reproduction point are carried out can be shortened in comparison with the case as in the related art where the picture data of the reproduction point is output from the computer 2 to the reproduction apparatus 4 for decoding after the reproduction start command is input to the computer 2, so the response can be raised.

Further, in the data processing system 1, the CPU 20 of the computer 2 outputs GOPs to the reproduction apparatus 4 so that a GOP one position in display order before the GOP being reproduced in the reproduction apparatus 4 and a GOP one position in display order after it are stored in the input memory 32 of the reproduction apparatus 4. Due to this, decoding results of surrounding GOPs of the GOP being reproduced can be stored in the reproduction memories 36_1, 36_2, and 36_3 in an early stage, and reproduction and output in accordance with the command can be quickly carried out when a reverse reproduction command or X reproduction command is issued.

Further, in the data processing system 1, bank regions "1" to "5" in the reproduction memories 36_1, 36_2, and 36_3 of the reproduction apparatus 4 are used in a fixed manner as the storage regions for storing the decoding results of the I and P picture data, and the storage is held until the reproduction of the GOP ends. Due to this, the reproduction and output of any picture data of the GOP storing the I and P picture data in the reproduction memories 36_1, 36_2, and 36_3 can be carried out in the time for decoding 1 picture data from receiving the command.

Further, in the data processing system 1, the decoding of the picture data decoded with reference to the decoding results of the same I and P picture data is assigned to the same decoder among the decoders 34_1, 34_2, and 34_3. Due to this, the decoding results can be efficiently referred to.

Second Embodiment

Figure 8:
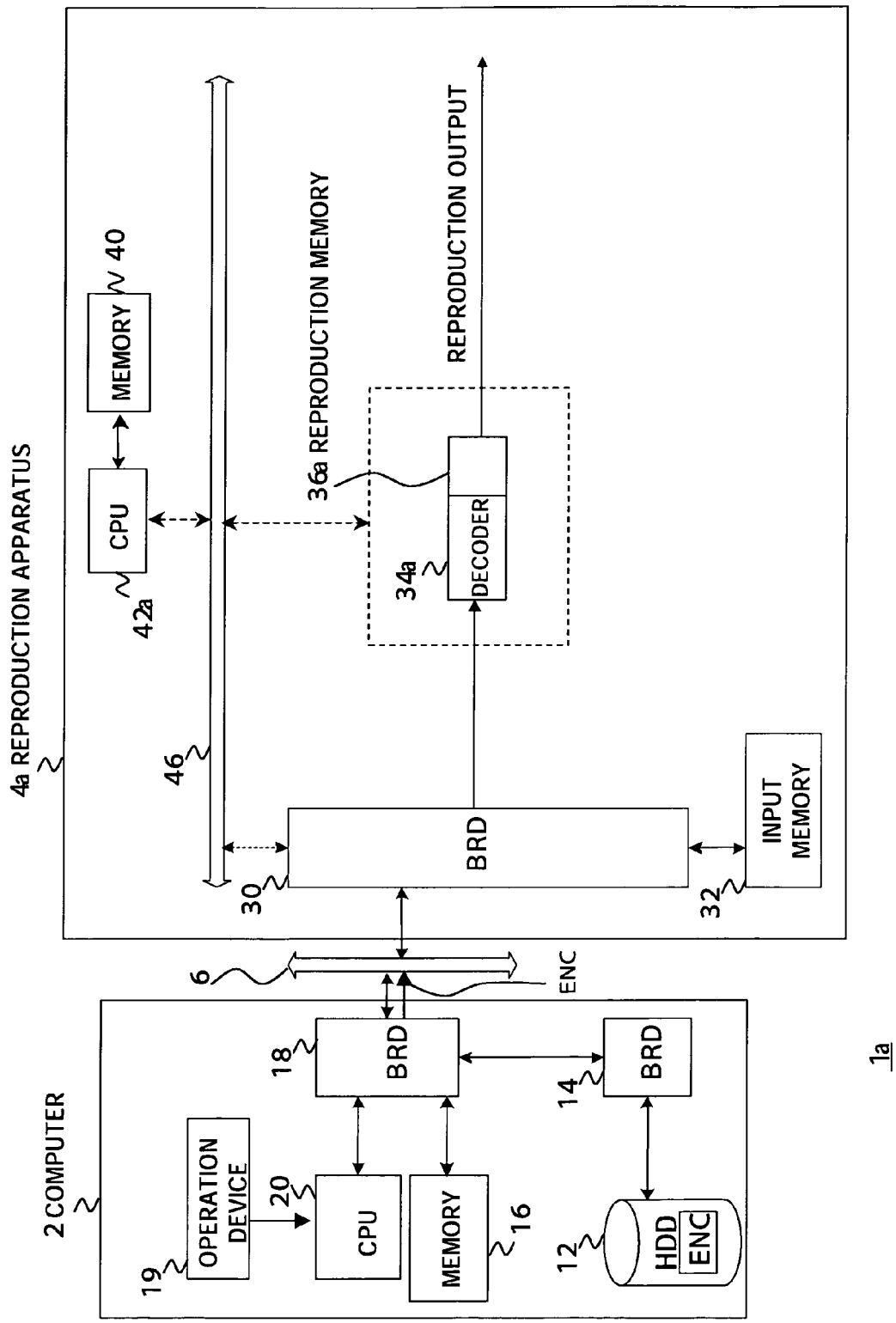
FIG. 8 is a view of the overall configuration of a data processing system according to a second embodiment of the present invention.

The reproduction apparatus 4 of the first embodiment had three decoders and three reproduction memories able to store three GOPs' worth of the decoded picture data, but the reproduction apparatus of the present embodiment has one decoder and one reproduction memory able to store three GOPs' worth of the decoded picture data. FIG. 8 is a view of the overall configuration of a data processing system 1a according to the present embodiment.

As shown in FIG. 8, the data processing system 1a has a computer 2 and a reproduction apparatus 4a. The reproduction apparatus 4a has the same configuration as that of the reproduction apparatus 4 of the first embodiment except that it has a decoder 34a in place of the decoders 34_1, 34_2, and 34_3, has a reproduction memory 36a in place of the reproduction memories 36_1, 36_2, and 36_3, has a CPU 42a, but does not have a selector 38.

The decoder 34a of the reproduction apparatus 4a receives as input the reproduced data ENC read from the input memory 32 through the PCI bridge 30 under the control of the CPU 42a, decodes this by the MPEG scheme, and writes it in the reproduction memory 36a. Specifically, the decoder 34a decodes the I picture data in the GOP read from the input memory 32 under the control of the CPU 42a without reference with the decoding results of the other picture data. Further, the decoder 34a decodes the P picture data in the GOP read from the input memory 32 under the control of the CPU 42a with reference to the decoding results of the I or P picture data positioned time-wise in the past and already decoded. Further, the decoder 34a decodes the B picture data in the GOP read from the input memory 32 under the control of the CPU 42a with reference to the decoding results of the I or P picture data positioned time-wise in front or in back and already decoded.

Figure 9:
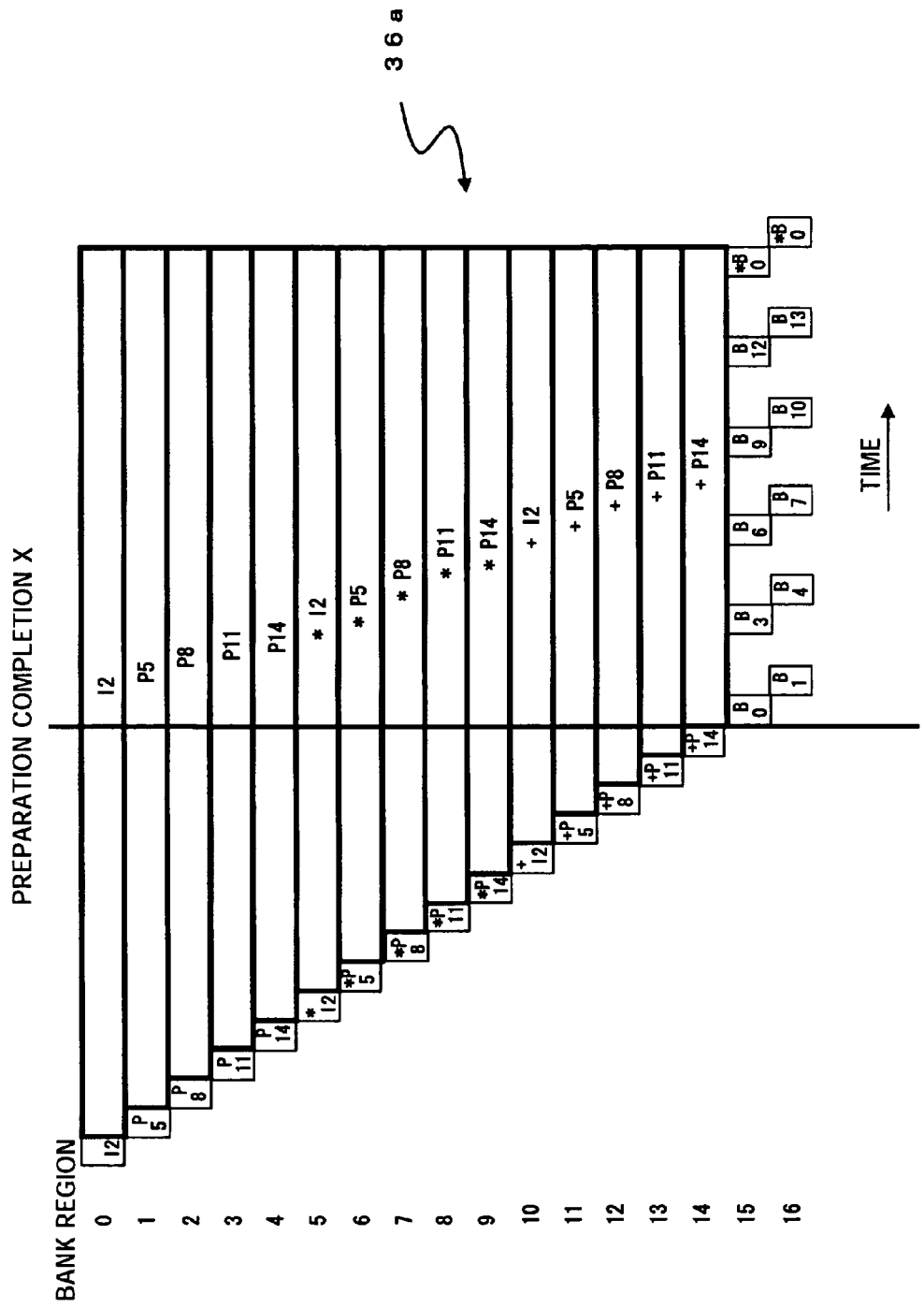
FIG. 9 is a view for explaining the storage state of a reproduction memory 36$a$ of a second embodiment.

Below, a writing method of the decoding results into the reproduction memory 36a by the decoder 34a will be explained. As shown in FIG. 9, the reproduction memory 36a has 17 bank regions "0" to "16". In the present embodiment, as shown in FIG. 9, among the 17 bank regions provided the reproduction memory 36a, 15 bank regions "0" to "14" are used in a fixed manner as the storage regions for storing the decoding results of the I and P picture data, and two bank regions "15" and "16" are used in a fixed manner as the storage regions for storing the decoding results of the B picture data. When decoding the reproduced data ENC shown in FIG. 2, the decoder 34a, for example, as shown in FIG. 9, writes the I2, P5, P8, P11, and P14 picture data in the GOP (N−1), the I2, P5, P8, P11, and P14 picture data in the GOP (N), and the I2, P5, P8, P11, and P14 picture data in the GOP(N+1) in the bank regions "0" to "14" in the reproduction memory 36a.

Further, the decoder 34a refers to decoding results of the I and P picture data stored in the bank regions "0" to "5" of the reproduction memory 36a when decoding the B picture data in the GOP (N−1). Further, the decoder 34a refers to decoding results of the I and P picture data stored in the bank regions "6" to "10" of the reproduction memory 36a when decoding the B picture data in the GOP(N). Further, the decoder 34a refers to decoding results of the I and P picture data stored in the bank regions "11" to "14" of the reproduction memory 36a when decoding the B picture data in the GOP(N+1).

The CPU 42a performs the following processing based on the program stored in the control memory 40 and the data to centrally control the operation of the reproduction apparatus 4. The CPU 42a writes the GOP (reproduced data ENC) input from the computer 2 in the input memory 32. Further, the CPU 42a performs the scheduling for determining the order for decoding the picture data in the GOP in units of GOPs for the reproduced data ENC stored in the input memory 32.

The CPU 42a makes the decoder 34a execute the following decoding based on the results of the scheduling. The CPU 42a for example reads the I and P picture data in the GOP(N−1) and the B picture data in the GOP(N) decoded with reference to the decoding results of the I and P picture data from the input memory 32 through the PCI bridge 30 and outputs the same to the decoder 34a. Here, in the present embodiment, the B picture data refers to the open GOP decoded with reference to the decoding results of the I and P picture data of different GOPs. Specifically, for example, the B0 and B1 picture data in the GOP(N) shown in FIG. 2 are decoded with reference to the decoding results of the I and P picture data in the GOP(N−1). Accordingly, the CPU 42a outputs the B0 and B1 picture data in the GOP(N) to the decoder 34a. Further, the CPU 42a for example reads the I and P picture data in the GOP(N) and the B picture data in the GOP(N+1) decoded with reference to the decoding results of the I and P picture data from the input memory 32 through the PCI bridge 30 and outputs the same to the decoder 34a. Further, the CPU 42a for example reads the I and P picture data in the GOP(N+1) and the B picture data in the GOP(N+2) decoded with reference to the decoding results of the I and P picture data from the input memory 32 through the PCI bridge 30 and outputs the same to the decoder 34a.

The CPU 42a for example makes the decoder 34a perform the decoding up to the timing of the preparation completion X shown in FIG. 9 before inputting the reproduction start command from the CPU 20 of the computer 2. As a result, at the timing when the CPU 42a receives as input the reproduction start command from the CPU 20, decoding results of the GOP(N−1), GOP(N), and GOP(N+1) are stored in the reproduction memory 36a. Further, the CPU 42a, when receiving as input the reproduction start command designating the reproduction point from the computer 2, controls the decoding of the B picture data by the decoder 34a and the read operation from the reproduction memory 36 so that the reproduction and output are carried out at a designated speed in the direction designated from the reproduction point.

As explained above, in the data processing system 1a, when the reproduction point is designated in accordance with the operation of the operation device 19 of the computer 2 by the user, the computer 2 outputs the GOP including the picture data of the designated reproduction point to the reproduction apparatus 4a. Then, the reproduction apparatus 4a automatically decodes the GOP input from the computer 2 at the decoder 34a and writes the decoding results in the reproduction memory 36a. Thereafter, when the reproduction start command is input in accordance with the operation of the operation device 19 of the computer 2 by the user, the computer 2 outputs the reproduction start command to the reproduction apparatus 4a, and the reproduction apparatus 4a performs the reproduction and output in accordance with the reproduction point based on the decoding results stored in the reproduction memory 36a. Due to this, in comparison with the case as in the related art where the picture data of the reproduction point is output from the computer 2 to the reproduction apparatus 4a after the reproduction start command is input to the computer 2, even when there is only one decoder, if there are three GOPs' worth of banks in the reproduction memory, the time from when the reproduction start command is input to when the reproduction and output of the designated reproduction point are carried out can be shortened, and the response can be raised.

Further, in the data processing system 1a, the CPU 20 of the computer 2 outputs the GOPs to the reproduction apparatus 4a so that a GOP one position in display order before the GOP being reproduced in the reproduction apparatus 4 and a GOP one position in display order after it are stored in the input memory 32 of the reproduction apparatus 4. Due to this, decoding results of surrounding GOPs of the GOP being reproduced can be stored in the reproduction memory 36a in an early stage, and the reproduction and output in accordance with the command can be quickly carried out when a reverse reproduction command or a higher speed reproduction command is issued.

Further, in the data processing system 1a, the bank regions "0" to "14" in the reproduction memory 36a of the reproduction apparatus 4a are used in a fixed manner as the storage regions for storing the decoding results of the I and P picture data, and the storage is held until the reproduction of the GOP ends. Due to this, the reproduction and output of any picture data of the GOP storing the I and P picture data in the reproduction memory 36a can be carried out in the time for decoding 1 picture data from receiving the command.

Third Embodiment

Figure 10:
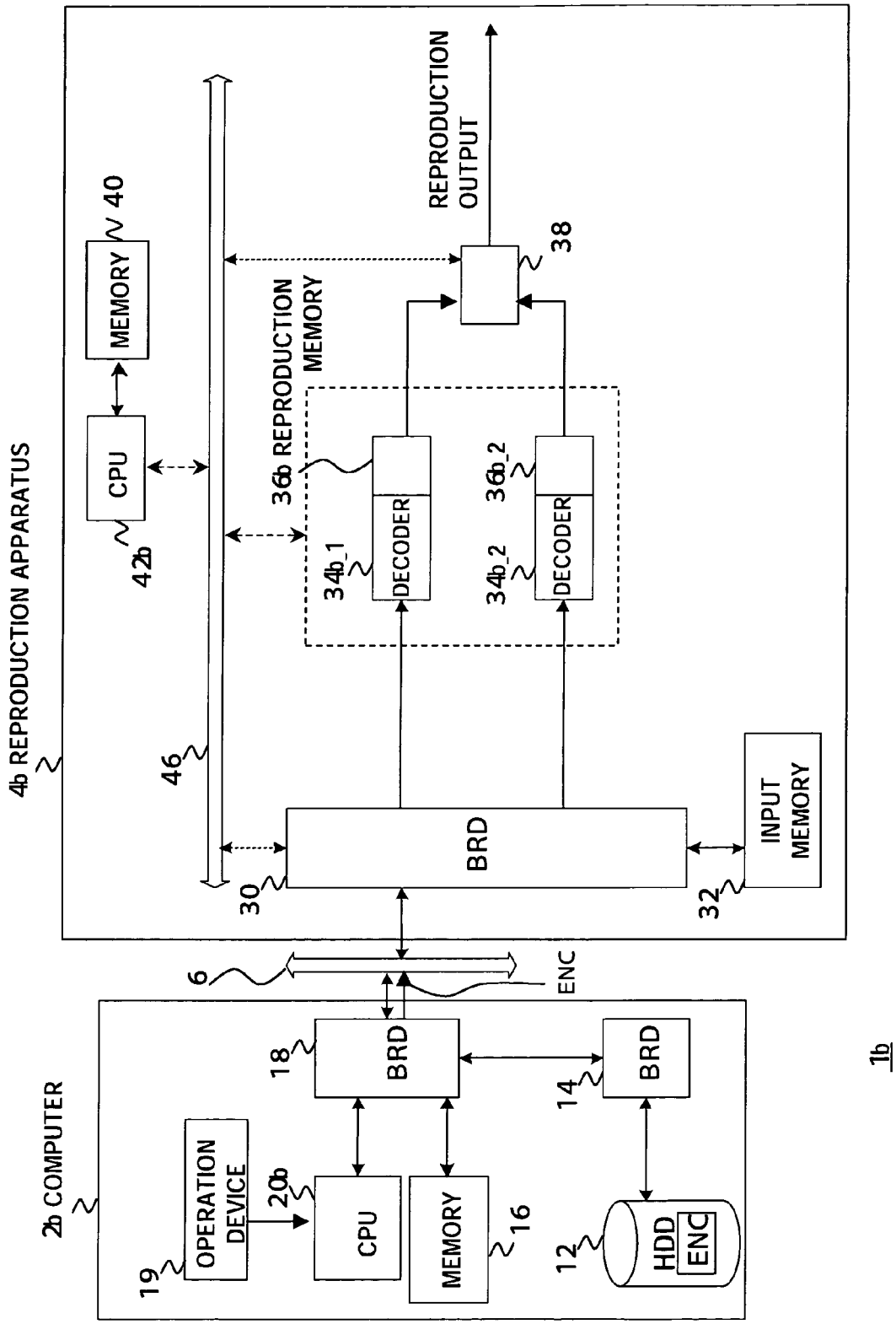
FIG. 10 is a view of the overall configuration of a data processing system according to a third embodiment of the present invention.

A reproduction apparatus 4b of the present embodiment as two decoders and one reproduction memory able to store two GOPs' worth of the decoded picture data. FIG. 10 is a view of the overall configuration of a data processing system 1b according to the present embodiment.

As shown in FIG. 10, the data processing system 1b has a computer 2b and a reproduction apparatus 4b. The computer 2b has the same configuration as that of the computer 2b of the first embodiment except the CPU 20b. The reproduction apparatus 4b has the same configuration as that of the reproduction apparatus 4 of the first embodiment except that it has decoders 34b_1 and 34b_2 in place of the decoders 34_1, 34_2, and 34_3, has the reproduction memories 36b_1 and 36b_2 in place of the reproduction memories 36_1, 36_2, and 36_3, and has a CPU 42b.

The CPU 20b for example executes the program read out from the memory 16 to centrally control the operation of the computer 2b. When receiving as input an operation signal indicating an operation designating the reproduction point from the operation device 19, the CPU 20b reads the GOP including the picture data of the designated reproduction point from the HDD 12 and outputs it through the bridge 18 and the PCI bus 6 to the reproduction apparatus 4b. Further, when receiving as input an operation signal indicating a reproduction start command operation from the operation device 19, the CPU 20b outputs a reproduction start command designating the reproduction point to the reproduction apparatus 4b through the bridge 18 and the PCI bus 6. Further, the CPU 20b outputs GOPs among the GOPs in the reproduced data ENC to the reproduction apparatus 4 so that the GOP including the reproduction point and the GOP one position in display order before it are stored in the input memory 32 of the reproduction apparatus 4b when the reproduction point is located in the first half of the GOP including the picture data of the reproduction point (portion of A of FIG. 11) in the reproduction apparatus 4b and so that the GOP including the reproduction point and the GOP one position in display order after it are stored in the input memory 32 of the reproduction apparatus 4b when the reproduction point is located in the latter half of the GOP including the picture data of the reproduction point (portion of B of FIG. 11).

The decoder 34b_1 receives as input the reproduced data ENC read from the input memory 32 through the PCI bridge 30 under the control of the CPU 42b, decodes this by the MPEG scheme, and writes it in the reproduction memory 36b_1. Specifically, the decoder 34b_1 decodes the I picture data in the GOP read from the input memory 32 under the control of the CPU 42b without reference with the decoding results of the other picture data. Further, the decoder 34b_1 decodes the P picture data in the GOP read from the input memory 32 under the control of the CPU 42b with reference to the decoding results of the I or P picture data positioned time-wise in the past and already decoded. Further, the decoder 34b_1 decodes the B picture data in the GOP read from the input memory 32 under the control of the CPU 42b with reference to the decoding results of the I or P picture data positioned time-wise in front or in back and already decoded. The decoder 34b_2 has the same configuration as that of the decoder 34b_1, decodes the picture data input through the PCI bridge 30 by the MPEG scheme and writes it in the reproduction memory 36b_2.

Figure 12A:
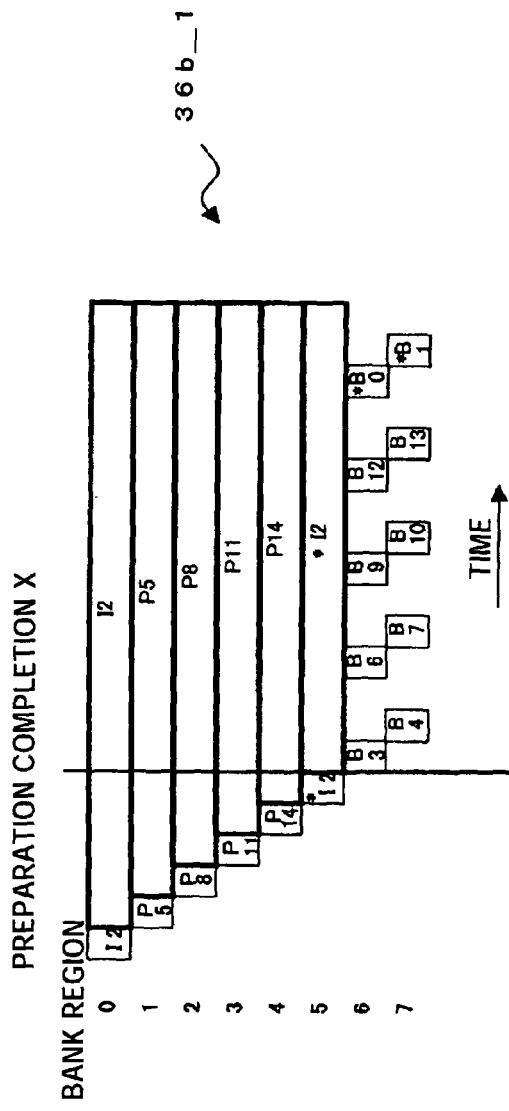
FIG. 12A is a view for explaining the storage state of a reproduction memory 36$b$_1 of the third embodiment.
Figure 12B:
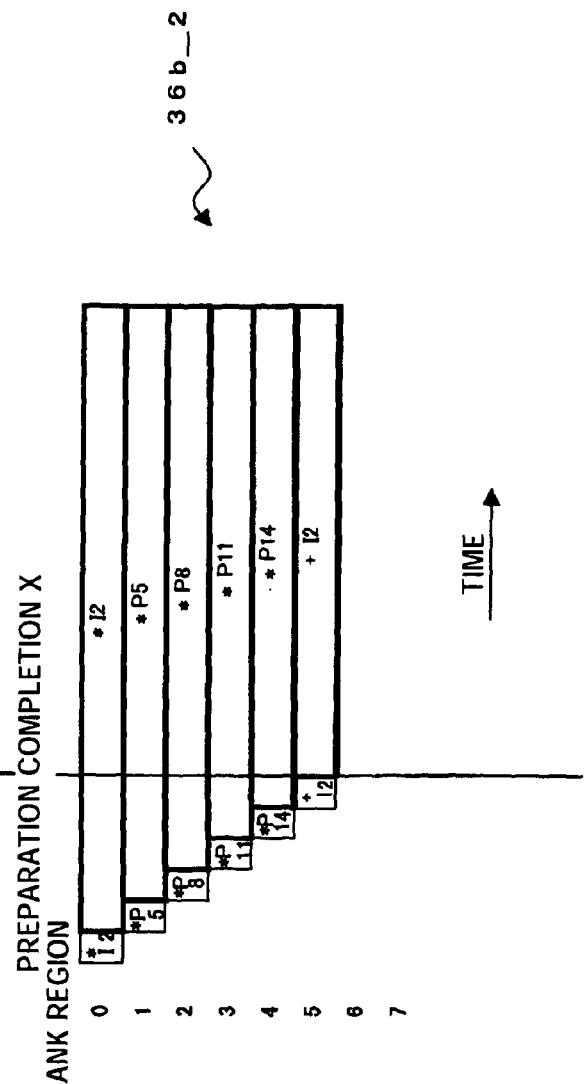
FIG. 12B is a view for explaining the storage state of a reproduction memory 36b_2 of the third embodiment.

Below, a writing method of the decoding results into the reproduction memories 36b_1 and 36b_2 by the decoders 34b_1 and 34b_2 will be explained. As shown in FIGS. 12(A) and 12(B), each of the reproduction memories 36b_1 and 36b_2 has eight bank regions "0" to "7". In the present embodiment, as shown in FIGS. 12A and 12B, among the eight bank regions provided in each of the reproduction memories 36b_1 and 36b_2, six bank regions "0" to "5" are used in a fixed manner as the storage regions for storing the decoding results of the I and P picture data, and two bank regions "6" and "7" are used in a fixed manner as the storage regions for storing the decoding results of the B picture data.

Figure 11:
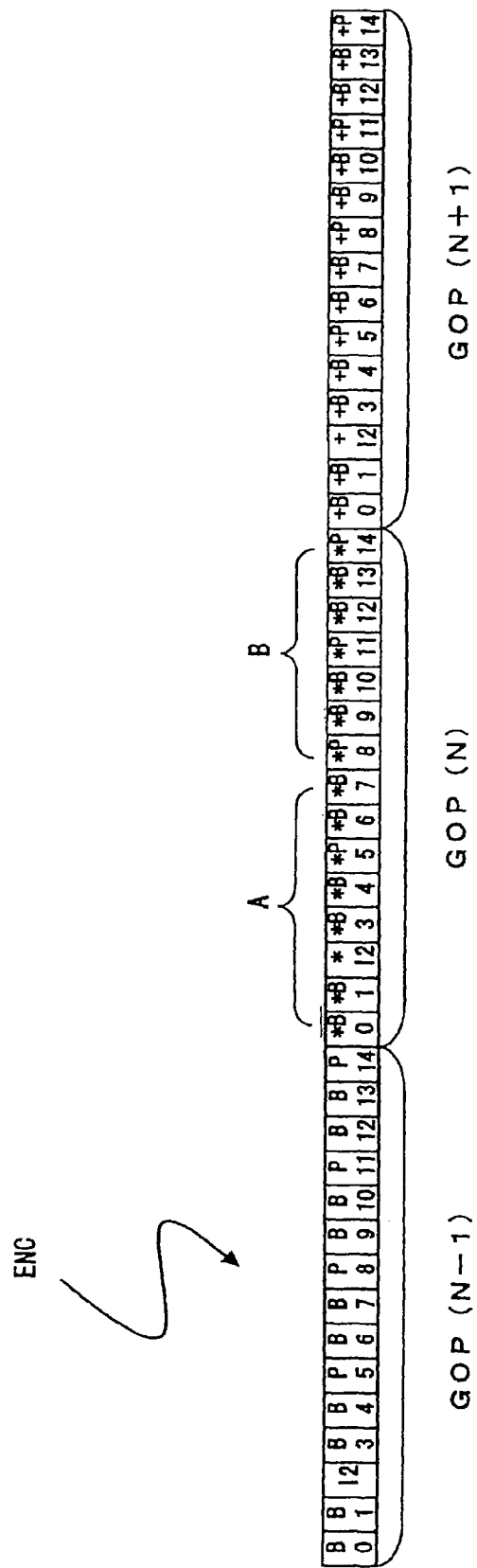
FIG. 11 is a view of reproduced data ENC reproduced in the third embodiment.

When the reproduction point is located in the portion of A of FIG. 11, the decoder 34b_1, for example, as shown in FIG. 12A, writes the I2, P5, P8, P11, and P14 picture data in the GOP(N−1) and the I2 picture data in the GOP(N) in the bank regions "0" to "5" in the reproduction memory 36b_1. Further, the decoder 34b_2, for example, as shown in FIG. 12(B), writes the I2, P5, P8, P11, and P14 picture data in the GOP(N) and the I2 picture data in the GOP(N+1) in the bank regions "0" to "5" in the reproduction memory 36b_2.

Further, the decoder 34b_1 refers to the decoding results of the I and P picture data stored in the bank regions "0" to "5" of the reproduction memory 36b_1 when decoding the B picture data in the GOP(N−1). Further, the decoder 34b_2 refers to the decoding results of the I and P picture data stored in the bank regions "6" to "10" of the reproduction memory 36b_2 when decoding the B picture data in the GOP(N).

When the reproduction point is located in the portion of B of FIG. 11, the decoder 34b_1 for example writes the I2, P5, P8, P11, and P14 picture data in the GOP(N) and the I2 picture data in the GOP(N+1) in the bank regions "0" to "5" in the reproduction memory 36b_1. Further, the decoder 34b_2 for example writes the I2, P5, P8, P11, and P14 picture data in the GOP(N+1) and the I2 picture data in the GOP(N+2) in the bank regions "0" to "5" in the reproduction memory 36b_2.

Further, the decoder 34b_1 refers to the decoding results of the I and P picture data stored in the bank regions "0" to "5" of the reproduction memory 36b_1 when decoding the B picture data in the GOP(N). Further, the decoder 34b_2 refers to the decoding results of the I and P picture data stored in the bank regions "6" to "10" of the reproduction memory 36b_2 when decoding the B picture data in the GOP(N+1).

The selector 38, under the control of the CPU 42b, switches and selectively reproduces and outputs the decoding results read from the reproduction memories 36b_1 and 36b_2.

The CPU 42b performs the following processing based on the program and data stored in the control memory 40 to centrally control the operation of the reproduction apparatus 4b. The CPU 42b writes the GOP input from the computer 2b (reproduced data ENC) to the input memory 32. Further, the CPU 42b performs the scheduling for determining the order of decoding the picture data in that GOP in units of GOPs for the reproduced data ENC stored in the input memory 32. The CPU 42 makes the decoders 34b_1 and 34b_2 execute the following decoding based on results of the scheduling. The CPU 42b, for example reads the I and P picture data in the GOP(N−1) and the B picture data in the GOP(N) decoded with reference to the decoding results of the I and P picture data via the PCI bridge 30 from the input memory 32 and outputs them to the decoder 34b_1. Here, in the present embodiment, the B picture data refers to an open GOP decoded with reference to decoding results of I and P picture data of different GOPs. Specifically, for example, the B0 and B1 picture data in the GOP(N) shown in FIG. 11 are decoded with reference to the decoding results of the I and P picture data in the GOP(N−1). Further, the CPU 42b for example reads the I and P picture data in the GOP(N) and the B picture data in the GOP(N+1) decoded with reference to the decoding results of the I and P picture data via the PCI bridge 30 from the input memory 32 and outputs them to the decoder 34b_2. The CPU 42b, for example, before receiving as input the reproduction start command from the CPU 20b of the computer 2b, makes the decoders 34b_1 and 34b_2 perform the decoding up to the timing of the preparation completion X shown in FIGS. 12A and 12B.

As a result, at the timing when the CPU 42b receives as input the reproduction start command from the CPU 20b, the decoding results of the I and P picture data of the GOP(N−1) and the GOP(N) are stored in the reproduction memories 36b_1 and 36b_2 when the reproduction point is located in the portion of A of FIG. 11 and the decoding results of the I and P picture data of the GOP(N) and the GOP(N+1) are stored in the reproduction memories 36b_1 and 36b_2 when the reproduction point is located in the portion of B of FIG. 11. Further, when receiving as input the reproduction start command designating the reproduction point from the computer 2b, the CPU 42b controls the decoding of the B picture data by the decoders 34_1b and 34b_2, the read operation from the reproduction memories 36b_1 and 36b_2 to the selector 38, and the selection operation of the selector 38 so that the reproduction and output are carried out at a designated speed in a designated direction from the reproduction point.

As explained above, in the data processing system 1b, when the reproduction point is designated in accordance with the operation of the operation device 19 of the computer 2b by the user, the computer 2b outputs the GOP including the designated reproduction point and the GOP one position before it to the reproduction apparatus 4b when the reproduction point is located in the first half of the GOP including the picture data of the reproduction point and outputs the GOP including the designated reproduction point and the GOP one position after it to the reproduction apparatus 4b when the reproduction point is located in the latter half of the GOP including the picture data of the reproduction point. Then, the reproduction apparatus 4b automatically decodes the GOP input from the computer 2b in the decoder 34b and writes the decoding results in the reproduction memory 36b. Thereafter, when the reproduction start command is input in accordance with the operation of the operation device 19 of the computer 2b by the user, the computer 2b outputs the reproduction start command to the reproduction apparatus 4b, and the reproduction apparatus 4b performs the reproduction and output in accordance with the reproduction point based on the decoding results stored in the reproduction memory 36b. Due to this, as in the related art, the time from when inputting the reproduction start command to when the reproduction and output of the designated reproduction point are carried out can be shortened even when the number of decoders is two in comparison with the case where the picture data of the reproduction point is output from the computer 2b to the reproduction apparatus 4b for decoding after the reproduction start command is input to the computer 2, so the response can be raised.

Further, in the data processing system 1b, the CPU 20b of the computer 2b outputs the GOPs to the reproduction apparatus 4b so that the GOP including the reproduction point and the GOP one position in display order before it are stored in the input memory 32 of the reproduction apparatus 4b when the first half of the GOP including the reproduction point is being reproduced in the reproduction apparatus 4b and so that the GOP including the reproduction point and the GOP one position in display order after it are stored in the input memory 32 of the reproduction apparatus 4b when the latter half of the GOP including the reproduction point is being reproduced. Due to this, the picture data at the position near the GOP being reproduced can be stored in the reproduction memory 36b in accordance with the position of the GOP being reproduced, and reproduction and output in accordance with the command can be quickly carried out when a reverse reproduction command or a higher speed reproduction command is issued.

Further, in the data processing system 1b, the bank regions "1" to "5" in the reproduction memory 36b_1 and bank regions "1" to "5" in the reproduction memory 36b_2 of the reproduction apparatus 4b are used in a fixed manner as the storage regions for storing the decoding results of the I and P picture data, and the storage is held until the reproduction of the GOP ends. Due to this, the reproduction and output of any picture data of the GOP storing the I and P picture data in the reproduction memories 36b_1 and 36b_2 can be carried out in the time for decoding one picture data from receiving the command.

Fourth Embodiment

Figure 13:
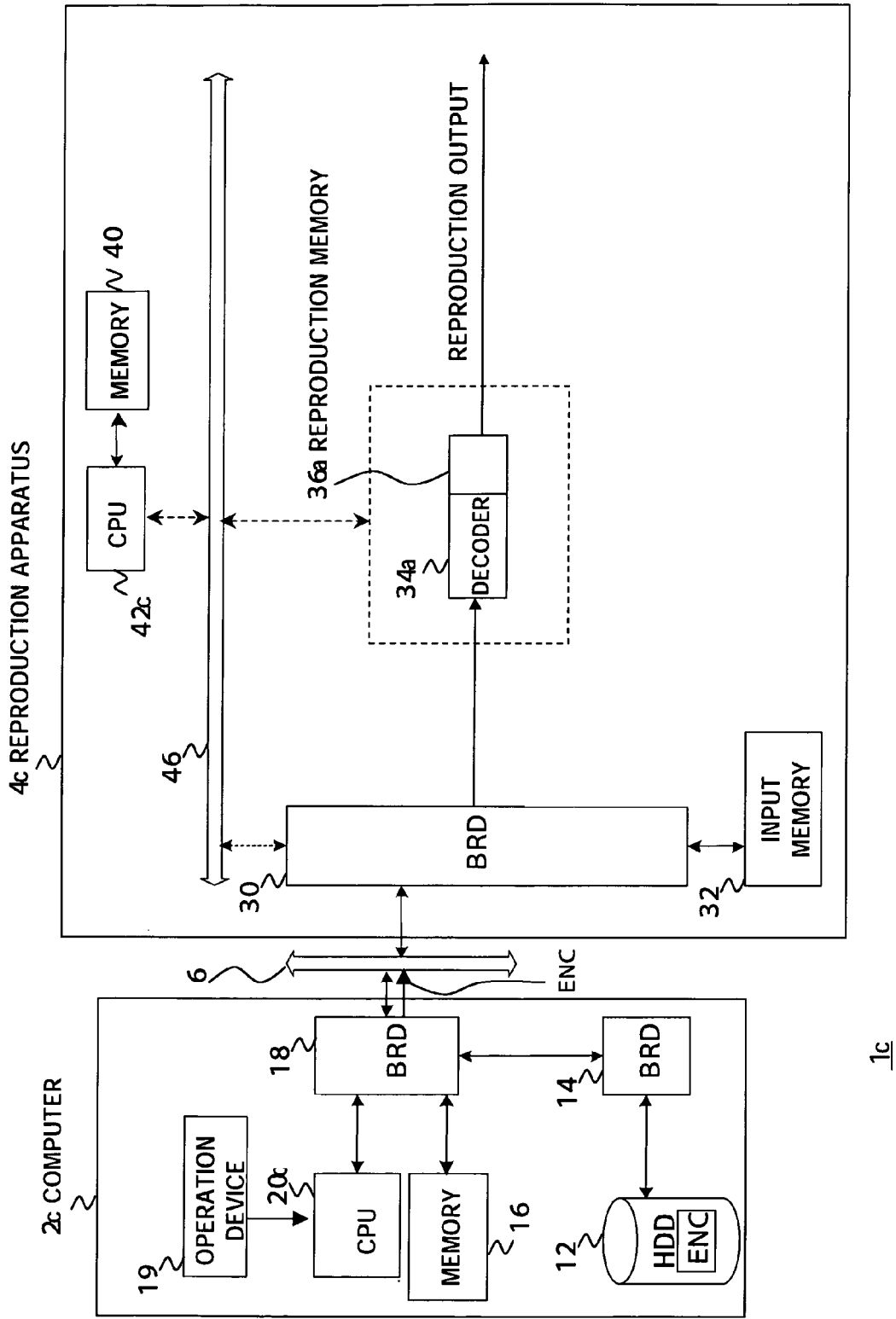
FIG. 13 is a view of the overall configuration of a data processing system according to a fourth embodiment of the present invention.

A reproduction apparatus 4c of the present embodiment has one decoder and one reproduction memory able to store two GOPs' worth of the decoded picture data. FIG. 13 is a view of the overall configuration of a data processing system 1c according to the present embodiment.

As shown in FIG. 13, the data processing system 1c has a computer 2c and a reproduction apparatus 4c. The computer 2c has the same configuration as that of the computer 2 of the first embodiment except the CPU 20c. The reproduction apparatus 4c has the same configuration as that of the reproduction apparatus 4 of the first embodiment except that it has a decoder 34c in place of the decoders 34_1, 34_2, and 34_3, has a reproduction memory 36c in place of the reproduction memories 36_1, 36_2, and 36_3, has a CPU 42b, but does not have a selector 38.

The CPU 20c, for example, executes a program read from the memory 16 to centrally control the operation of the computer 2c. When the CPU 20c receives as input an operation signal indicating an operation for designating a reproduction point from the operation device 19, it reads the GOP including the picture data of the designated reproduction point from the HDD 12 and outputs it through the bridge 18 and PCI bus 6 to the reproduction apparatus 4c. Further, when receiving as input an operation signal indicating a reproduction start command operation from the operation device 19, the CPU 20c outputs a reproduction start command designating a reproduction point through the bridge 18 and PCI bus 6 to the reproduction apparatus 4c. Further, the CPU 20c outputs the GOPs among GOPs in the reproduced data ENC to the reproduction apparatus 4c so that the GOP including the reproduction point and the GOP one position in display order before it are stored in the input memory 32 of the reproduction apparatus 4c when the reproduction point is located in the first half of the GOP including the picture data of the reproduction point (portion of A of FIG. 14) in the reproduction apparatus 4c and so that the GOP including the reproduction point and the GOP one position in display order after it are stored in the input memory 32 of the reproduction apparatus 4c when the reproduction point is located in the latter half of the GOP including the picture data of the reproduction point (portion of B of FIG. 14).

The decoder 34c receives as input the reproduced data ENC read from the input memory 32 through the PCI bridge 30 under the control of the CPU 42c, decodes this by the MPEG scheme, and writes it in the reproduction memory 36c. Specifically, the decoder 34c decodes the I picture data in the GOP read from the input memory 32 under the control of the CPU 42c without reference to the decoding results of the other picture data. Further, the decoder 34c decodes the P picture data in the GOP read from the input memory 32 under the control of the CPU 42c with reference to the decoding results of the I or P picture data positioned time-wise in the past and already decoded. Further, the decoder 34c decodes the B picture data in the GOP read from the input memory 32 under the control of the CPU 42c with reference to the decoding results of the I or P picture data positioned time-wise in front or in back and already decoded.

Figure 15:
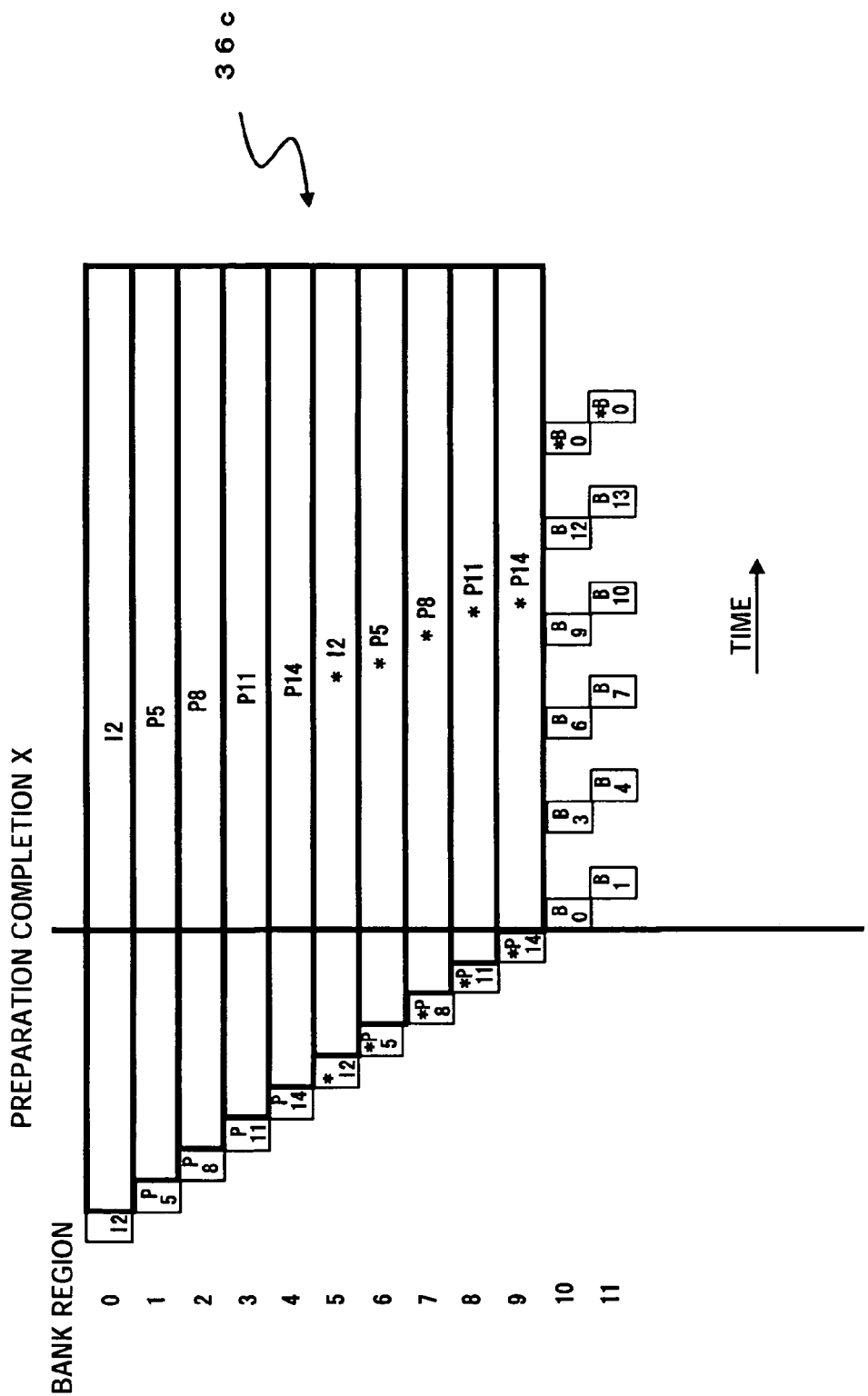
FIG. 15 is a view for explaining the storage state of a reproduction memory 36c of a fourth embodiment.

Below, a writing method of the decoding results into the reproduction memory 36c by the decoder 34c will be explained. As shown in FIG. 15, the reproduction memory 36c has 12 bank regions "0" to "11". In the present embodiment, as shown in FIG. 15, among the 12 bank regions provided in the reproduction memory 36c, nine bank regions "0" to "9" are used in a fixed manner as the storage regions for storing the decoding results of the I and P picture data, and two bank regions "10" and "11" are used in a fixed manner as the storage regions for storing the decoding results of the B picture data.

Figure 14:
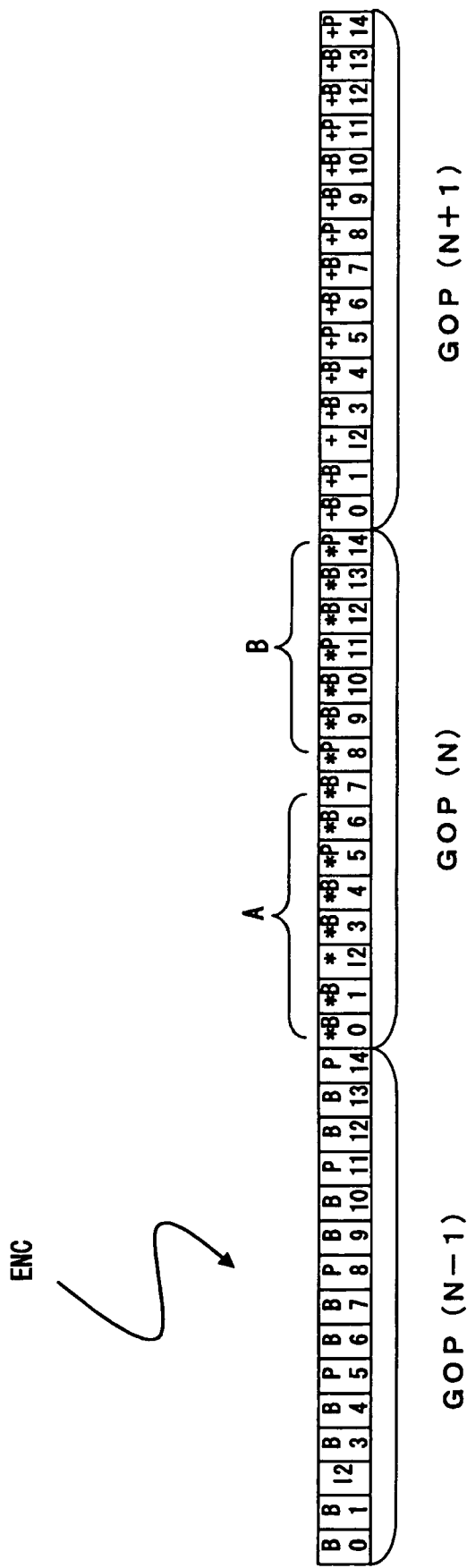
FIG. 14 is a view of the reproduced data ENC reproduced in the fourth embodiment.

When the reproduction point is located in the portion of A of FIG. 14, the decoder 34c, for example, as shown in FIG. 15, writes the I2, P5, P8, P11, and P14 picture data in the GOP (N−1) and the I2, P5, P8, P11, and P14 picture data in the GOP(N) in the bank regions "0" to "9" in the reproduction memory 36c.

Further, the decoder 34c refers to the decoding results of the I and P picture data stored in the bank regions "0" to "4" of the reproduction memory 36c when decoding the B picture data in the GOP(N−1). Further, the decoder 34c refers to the decoding results of the I and P picture data stored in the bank regions "5" to "9" of the reproduction memory 36c when decoding the B picture data in the GOP(N).

When the reproduction point is located in the portion of B of FIG. 114, the decoder 34c for example writes the I2, P5, P8, P11, and P14 picture data in the GOP(N) and the I2, P5, P8, P11, and P14 picture data in the GOP(N+1) in the bank regions "0" to "9" in the reproduction memory 36c.

Further, the decoder 34c refers to the decoding results of the I and P picture data stored in the bank regions "0" to "4" of the reproduction memory 36c when decoding the B picture data in the GOP(N). Further, the decoder 34c refers to the decoding results of the I and P picture data stored in the bank regions "5" to "9" of the reproduction memory 36c when decoding the B picture data in the GOP(N+1).

The CPU 42c performs the following processing based on the program and data stored in the control memory 40 to centrally control the operation of the reproduction apparatus 4c. The CPU 42c writes the GOP input from the computer 2c (reproduced data ENC) to the input memory 32. Further, the CPU 42c performs the scheduling for determining the order of decoding the picture data in that GOP in units of GOPs for the reproduced data ENC stored in the input memory 32. The CPU 42c makes the decoder 34c execute the following decoding based on results of the scheduling. The CPU 42c, for example reads the I and P picture data in the GOP(N−1) and the B picture data in the GOP(N) decoded with reference to decoding results of the I and P picture data via the PCI bridge 30 from the input memory 32 and outputs them to the decoder 34b_1. Here, in the present embodiment, the B picture data refers to an open GOP decoded with reference to decoding results of I and P picture data of different GOPs. Specifically, for example, the B0 and B1 picture data in the GOP(N) shown in FIG. 14 are decoded with reference to the decoding results of I and P picture data in the GOP(N−1).

Further, the CPU 42c for example reads the I and P picture data in the GOP(N) and the B picture data in the GOP(N+1) decoded with reference to the decoding results of the I and P picture data via the PCI bridge 30 from the input memory 32 and outputs them to the decoder 34c. The CPU 42c, for example, makes the decoder 34c perform the decoding up to the timing of the reparation completion X shown in FIG. 15 before receiving as input the reproduction start command from the CPU 20c of the computer 2c.

As a result, at the timing when the CPU 42c receives as input the reproduction start command from the CPU 20c, the decoding results of the I and P picture data of the GOP(N−1) and the GOP(N) are stored in the reproduction memory 36c when the reproduction point is located in the portion of A of FIG. 14, and the decoding results of the I and P picture data of the GOP(N) and the GOP(N+1) are stored in the reproduction memory 36c when the reproduction point is located in the portion of B of FIG. 14. Further, when receiving as input the reproduction start command designating the reproduction point from the computer 2c, the CPU 42c controls the decoding of the B picture data by the decoder 34c and the read operation from the reproduction memory 36c so that the reproduction and output are carried out at a designated speed in a designated direction from the reproduction point.

As explained above, in the data processing system 1c, when the reproduction point is designated in accordance with the operation of the operation device 19 of the computer 2c by the user, the computer 2c outputs the GOP including the designated reproduction point and the GOP one position before it to the reproduction apparatus 4c when the reproduction point is located in the first half of the GOP including the picture data of the reproduction point and outputs the GOP including the designated reproduction point and the GOP one position after it to the reproduction apparatus 4c when the reproduction point is located in the latter half of the GOP including the picture data of the reproduction point. Then, the reproduction apparatus 4c automatically decodes the GOP input from the computer 2c in the decoder 34c and writes the decoding results in the reproduction memory 36c. Thereafter, when the reproduction start command is input in accordance with the operation of the operation device 19 of the computer 2c by the user, the computer 2c outputs the reproduction start command to the reproduction apparatus 4c, and the reproduction apparatus 4c performs the reproduction and output in accordance with the reproduction point based on the decoding results stored in the reproduction memory 36c. Due to this, the time from when inputting the reproduction start command to when the reproduction and output of the designated reproduction point are carried out can be shortened even when there is only one decoder and the reproduction memory has only two GOPs' worth of banks in comparison with the case as in the related art where the picture data of the reproduction point is output from the computer 2c to the reproduction apparatus 4c for decoding after the reproduction start command is input to the computer 2c, so the response can be raised.

Further, in the data processing system 1c, the CPU 20c of the computer 2c outputs GOPs to the reproduction apparatus 4bc so that the GOP including the reproduction point and the GOP one position in display order before it are stored in the input memory 32 of the reproduction apparatus 4c when the first half of the GOP including the reproduction point is being reproduced in the reproduction apparatus 4c, while the GOP including the reproduction point and the GOP one position in display order after it are stored in the input memory 32 of the reproduction apparatus 4c when the latter half of the GOP including the reproduction point is being reproduced. Due to this, the picture data at the position near the GOP being reproduced can be stored in the reproduction memory 36c in accordance with the position of the GOP being reproduced, and the reproduction and output in accordance with the command can be quickly carried out when a reverse reproduction command or a higher speed reproduction command is issued.

Further, in the data processing system 1c, the bank regions "0" to "9" in the reproduction memory 36c of the reproduction apparatus 4c are used in a fixed manner as storage regions for storing the decoding results of the I and P picture data, and the storage is held until the reproduction of the GOP ends. Due to this, the reproduction and output of any picture data of the GOP storing the I and P picture data in the reproduction memory 36c can be carried out in the time for decoding one picture data from receiving the command.

The present invention is not limited to the above embodiments. In the above embodiments, as the "first command for designating the reproduction point" of the present invention, the case where the user operates the operation device 19 of computers 2, 2b, and 2c (for example, depresses the reproduction button) was illustrated, but the first command may be a command automatically issued related to another operation by a system where an application reproduces the content data from the head as well. In this case, the predetermined data such as head picture data of the content data becomes the reproduction point.

Further, in the above embodiments, the MPEG was exemplified as the encoding scheme, but the present invention can be applied in the same way to also the case where the data is comprised of first type of picture data having decoding results referred to by the decoding of the other picture data and second type of picture data having decoding results not referred to by the decoding of other picture data as components as in H.264/AVC (Advanced Video Coding). Further, the above embodiments may generate the results of scheduling of all picture data in the GOP in the decoding scheduling and property data (flag data) defining to which of valid and invalid each picture data is set in accordance with the reproduction rate in all picture data and update the property data in accordance with the reproduction rate designated at the time of the decoding and reproduction of the picture data. Then, in the decoding and reproduction of the picture data, the decoding and reproduction and output of the picture data are carried out based on the updated property data.

In the above embodiments, the case where compressed picture data was stored in the HDD 12 was explained, but the present invention is not limited to this, for example, can also be applied to storage through an input/output interface etc. on an optical disk, magneto-optic disk, semiconductor memory, magnetic disk, or other various storage media. Further, the mode of connection is not limited to connection through cables etc. For example, connection by other types of connection modes such as connection by wires or wirelessly from the outside is also possible.

Further, in the above embodiments, the case of performing a series of processing by hardware having those functions was explained, but the present invention is not limited to this. Use of software for this is also possible. At this time, when performing a series of processing by software, various types of functions may be realized by installing various programs into the computer in which the program forming that software is built into to dedicated hardware. For example, it is installed in a general use personal computer etc. from for example a storage medium. Further, the storage medium for example includes an optical disk, magneto-optic disk, semiconductor memory, magnetic disk or other various storage media needless to say. Further, for example, it is also possible to install various types of programs in a general personal computer etc. for example by downloading them through the Internet or other networks.

Further, in the above embodiments, the steps describing the program stored in the storage medium may of course be performed in time sequence along the described order of course, but the invention is not limited in time sequence. Performance in parallel or individually is also included.

Further, in the above embodiments, the reproduction rate is not particularly limited. The invention may be broadly applied to specific processing of the reproduction apparatus at any variable speed reproduction operations.

Further, the block configurations of the embodiments are examples of the block configurations. The invention is not limited to the illustrated examples.

Further, by suitably providing a group of read flags indicating if the data read from the HDD 12 is valid for the compressed and encoded data stored in the HDD 12, a group of decode flags indicating validity at the time of scheduling of decoding, a group of display flags indicating validity at scheduling for display of the decoded data, etc. as metadata and automatically updating the series of flag groups in accordance with reproduction speed and direction, scheduling can be managed. At this time, the past series of scheduling used in variable speed reproduction and update information of the groups of flags may be managed as separate scheduling metadata (history information). This may in accordance with need be described as syntax in the compressed and encoded data or separately stored in a storage medium such as the HDD 12.

Further, the number of the decoders, the number of the banks, the decoder IDs, etc. may also be managed as metadata (component history information). Further, the reproduction speed, reproduction direction, etc. may also be managed as metadata (reproduction history information). At this time, the metadata may if necessary be described as syntax in the compressed and encoded data or separately stored in a storage medium such as the HDD 12. By referring to such metadata (history information), it is possible to reuse scheduling performed in the past and further to perform scheduling faster and more accurately. Note that this metadata may also be comprised so as to be managed at an outside apparatus as for example a database.

Note that, in the above embodiments, the present invention can also be applied to a case when the decoders 34-1 to 34-3, 34*a*, 34*b*_1, 34*b*_2, and 34*c* do not completely decode the compressed and encoded data stored on the HDD 12 (decode it up the middle). Specifically, for example, the present invention may also be applied to a case where the decoders 34-1 to 34-3, 34*a*, 34*b*_1, 34*b*_2, and 34*c* only perform decoding for variable length encoding and inverse quantization and do not perform inverse DCT, a case where they perform inverse quantization, but do not perform decoding for variable length encoding, etc. In such a case, for example, the decoders 34-1 to 34-3, 34*a*, 34*b*_1, 34*b*_2, and 34*c* may generate history information indicating for example up to what stage of encoding and decoding (for example, stage of inverse quantization) they performed processing for and output this linked with the incompletely decoded data.

Further, in the above embodiments, the HDD 12 stored incompletely encoded data (for example, data for which DCT and quantization were performed, but for which variable length encoding was not performed) and, in accordance with need, history information of the encoding and decoding, but the present invention may also be applied to the case where the decoders 34_1 to 34_3, 34*a*, 34*b*_1, 34*b*_2, 34*c* can decode incompletely encoded data supplied under the control of the CPUs 20, 20*b*, 20*c* and convert it to a baseband signal. Specifically, the present invention can also be applied to the case where the decoders 34_1 to 34_3, 34*a*, 34*b*_1, 34*b*_2, 34*c* for example perform inverse DCT and inverse quantization for data to which DCT and quantization have been applied, but variable length encoding has not been applied and do not perform decoding for variable length encoding. Further, in such a case, for example, the CPUs 20, 20*b*, 20*c* may obtain the history information of encoding and decoding stored in the HDD 12 linked with the incompletely encoded data and schedule the decoding by the decoders 34_1 to 34_3, 34*a*, 34*b*_1, 34*b*_2, 34*c* based on that information.

Further, in the above embodiments, the HDD 12 stored the incompletely encoded data and, in accordance with need, history information of encoding and decoding, but the present invention may also be applied to the case where the decoders 34_1 to 34_3, 34*a*, 34*b*_1, 34*b*_2, 34*c* do not completely decode the incompletely encoded data supplied under the control of the CPUs 20, 20*b*, 20*c* (decode it only to an intermediate stage). Further, in such a case as well, for example, the CPUs 20, 20*b*, 20*c* may obtain the history data of encoding and decoding stored in the HDD 12 linked with the incompletely encoded data and schedule the decoding by the decoders 34_1 to 34_3, 34*a*, 34*b*_1, 34*b*_2, 34*c* based on this information. Further, in this case as well, the decoders 34_1 to 34_3, 34*a*, 34*b*_1, 34*b*_2, 34*c* may generate history information of encoding and decoding in accordance with need and output it linked with the incompletely decoded data. In other words, the present invention may also be applied to the case where the decoders 34_1 to 34_3, 34*a*, 34*b*_1, 34*b*_2, 34*c* perform partial decoding under the control of the CPUs 20, 20*b*, 20*c* (execute part of the steps of the decoding). The CPUs 20, 20*b*, 20*c* may obtain the history information of the encoding and decoding stored in the HDD 12 linked with the incompletely encoded-data and schedule the decoding by the decoders 34_1 to 34_3, 34*a*, 34*b*_1, 34*b*_2, 34*c* based on the information. The decoders 34_1 to 34_3, 34*a*, 34*b*_1, 34*b*_2, 34*c* may also generate history information of encoding and decoding in accordance with need and output it linked with the incompletely encoded data.

Further, the HDD 12 may further store information on the history of encoding and decoding processing linked with the compressed and encoded stream data, and the CPUs 20, 20*b*, 20*c* may schedule the decoding of the compressed and encoded stream data based on the information on the history of the encoding processing and the decoding processing. Further, even when the decoder 34_1 to 34_3, 34*a*, 34*b*_1, 34*b*_2, 34*c* can decode the compressed and encoded stream data and convert it to a baseband signal under the control of the CPUs 20, 20*b*, 20*c*, it is possible to generate the information on the history of encoding and decoding in accordance with need and enable it to be output linked with the baseband signal.

Note that in the above embodiments, the reproduction apparatuses 4, 4a, 4b, 4c were explained as having a plurality of decoders, but the present invention can also be applied to the case of a single decoder. At this time, the single decoder may not only receive, decode, and display or output the compressed and encoded data, but may also, in the same way as explained above, receive the compressed and encoded data, partially decode it up to an intermediate stage, and output it to the outside along with history information of encoding and decoding, receive partially encoded data, decode it, and convert it to a baseband signal for output to the outside, or receive partially encoded data, partially decode it to an intermediate stage, and output it to the outside along with history information of the encoding and decoding.

Further, in the above embodiments, the CPU 20 and CPU 42, the CPU 20 and CPU 42a, the CPU 20b and CPU 42b, and the CPU 20c and CPU 42c were configured separately, but the invention is not limited to this. For example, the CPU 20 and CPU 42, the CPU 20 and CPU 42a, the CPU 20b and CPU 42b, and the CPU 20c and CPU 42c may also conceivably be configured by single CPUs controlling the reproduction apparatus 4 as a whole. Further, even when the CPU 20 and CPU 42, the CPU 20 and CPU 42a, the CPU 20b and CPU 42b, and the CPU 20c and CPU 42c are configured independently, the CPU 20 and CPU 42, the CPU 20 and CPU 42a, the CPU 20b and CPU 42b, and the CPU 20c and CPU 42c may also be formed on single chips.

Further, when the CPU 20 and CPU 42, the CPU 20 and CPU 42a, the CPU 20b and CPU 42b, and the CPU 20c and CPU 42c are configured independently, it is possible to make at least part of the processing performed by the CPUs 20, 20b, 20c in the above embodiments be performed for example by time division by the CPUs 42, 42a, 42b, 42c or to make at least part of the processing performed by the CPUs 42, 42a, 42b, 42c be performed by for example time division by the CPUs 20, 20b, 20c. The CPU 20 and CPU 42, the CPU 20 and CPU 42a, the CPU 20b and CPU 42b, and the CPU 20c and CPU 42c may also be realized using processors able to perform dispersed processing.

Further, for example, the reproduction apparatuses 4, 4a, 4b, 4c may be configured to be able to be connected to a network and, in the above embodiments, at least part of the processing performed by the CPU 20 or CPU 42, CPU 20 and CPU 42a, CPU 20b and CPU 42b, and CPU 20c and CPU 42c may be performed at the CPU of another apparatus connected through the network. Similarly, in the above embodiments, the memories 32, 40, etc. were configured separately, but the invention is not limited to this. These memories may conceivably also be configured by a single memory in the reproduction apparatuses 4, 4a, 4b, 4c.

Further, in the above embodiments, the case of the HDD 12, the decoders 34_1 to 34_3, 34a, 34b_1, 34b_2, 34c, and the selector 38 being connected via bridges and buses and made integral as reproduction apparatuses was explained, but the present invention is not limited to this. For example, the invention may also be applied to the case where part of these components are connected by wires or wirelessly from the outside and the case where these components are connected to each other in other various modes of connection.

Further, in the above embodiments, the case of the compressed stream data being stored in an HDD was explained, but the present invention is not limited to this. For example, the invention may also be applied to the case of reproducing and processing stream data stored on an optical disk, magneto-optic disk, semiconductor memory, magnetic disk, or other various storage media.

Further, in the above embodiments, the CPU 42, memory 32, memory 40, decoders 34_1 to 34_3, 34a, 34b_1, 34b_2, 34c, and the selector 38 were mounted on the same expansion card (for example, PCI card or PCI-Express card), but the invention is not limited to this. For example, PCI-Express or other technology may be used to mount these components on separate expansion cards when the speed of transfer between cards is high.

Further, in this specification, a "system" means a logical collection of a plurality of apparatuses. It does not matter if the apparatuses of the different configurations are in the same housing or not.

The present invention may be applied to a system for reproducing reproduced data.

It should be understood by those skilled in the art that various modifications, combinations, sub-combinations, and alterations may occur depending on design requirements and other factors insofar as they are within the scope of the appended claims or the equivalents thereof.

What is claimed is:

1. A data processing system comprising:
   a computer to output to a reproduction apparatus data required for reproduction of a reproduction point in reproduced data when receiving as input a first command designating a reproduction point of reproduced data, to output to said reproduction apparatus a reproduction start command of said reproduction point when receiving as input a second command indicating the start of reproduction of said reproduction point designated by said first command after receiving as input said first command, to output to said reproduction apparatus a group of picture data one position in display order before a group of picture data to which said reproduction point belongs when said reproduction point is at a first half of said group of picture data to which said reproduction point belongs, and to output to said reproduction apparatus a group of picture data one position in display order after said group of picture data to which said reproduction point belongs when said reproduction point is at a second half of said group of picture data to which said reproduction point belongs; and
   a reproduction apparatus to decode data of said reproduction point based on said data input from said computer, to store a decoding result in a reproduction memory that stores data of two groups of picture data, and, when receiving as input said reproduction start command from the computer, reading, reproducing, and outputting the decoding results of said reproduction point from said reproduction memory.

2. A data processing system as set forth in claim 1, wherein said reproduced data is comprised of first picture data where the decoding results are referred to in decoding of other picture data and second picture data where the decoding results are not referred to in decoding of other picture data,
   said reproduction apparatus decodes said first picture data included in the group of picture data received from said computer, stores decoding results in said reproduction memory, and, when receiving said reproduction start command, reads and reproduces and outputs decoding results of said picture data from said reproduction memory when said reproduction point is said first picture data and decodes, reproduces, and outputs said picture data referring to decoding results stored in said reproduction memory when said reproduction point is said second picture data.

3. A reproduction apparatus comprising:
an input memory to store data required for reproduction of a reproduction point in reproduced data,
a communication interface to receive a group of picture data one position in display order before a group of picture data to which said reproduction point belongs when said reproduction point is at a first half of said group of picture data to which said reproduction point belongs and receives a group of picture data one position in display order after said group of picture data to which said reproduction point belongs when said reproduction point is at a second half of said group of picture data to which said reproduction point belongs
a reproduction memory to simultaneously store data of two groups of picture data, and
a decoder to decode said reproduction point based on data required for reproduction of said reproduction point read from said input memory, to write the decoding results in said reproduction memory, and to read, reproduce, and output decoding results of said reproduction point stored in said reproduction memory based on an input reproduction start command indicating said reproduction point.

4. A reproduction apparatus as set forth in claim 3, wherein
said reproduced data is comprised of first picture data where the decoding results are referred to in decoding of other picture data and second picture data where the decoding results are not referred to in decoding of other picture data, and
said decoder decodes said first picture data stores decoding results in said reproduction memory, and, when receiving said reproduction start command, reads and reproduces and outputs decoding results of said picture data from said reproduction memory when said reproduction point is said first picture data and decodes, reproduces, and outputs said picture data referring to decoding results stored in said reproduction memory when said reproduction point is said second picture data.

5. A reproduction apparatus as set forth in claim 3, wherein said decoder writes decoding results of said first picture data in a first storage region of said reproduction memory and writes decoding results of said second picture data in a second storage region of said reproduction memory not overlapping said first storage region.

6. A reproduction apparatus as set forth in claim 3, further comprising:
at least one decoder to process said reproduced data, wherein
said input memory stores a plurality of groups of picture data, and
said decoders read and decode said picture data stored in said input memory so that said second picture data referring to decoding results of a same first picture data are decoded by a same decoder circuit and so that said first picture data included in a same group of picture data are decoded by a same decoder circuit.

7. A reproduction apparatus as set forth in claim 3, comprising:
three decoders to process said reproduced data in parallel, and
among said three decoders, one decodes said group of picture data to which said reproduction point belongs and writes decoded group of picture data to which said reproduction point belongs in said reproduction memory, one decodes said group of picture data one position in display order before said group of picture data to which said reproduction point belongs and writes decoded group of picture data one position in display order before said group of picture data to which said reproduction point belongs in said reproduction memory, and a remaining one decodes said group of picture data one position in display order after said group of picture data to which said reproduction point belongs and writes decoded group of picture data one position in display order after said group of picture data to which said reproduction point belongs in said reproduction memory.

8. A reproduction apparatus as set forth in claim 3, comprising:
two decoders to process said reproduced data in parallel, and
among said two decoders, one decodes said group of picture data to which said reproduction point belongs and writes decoded group of picture data to which said reproduction point belongs in said reproduction memory, and a remaining one decodes said group of picture data one position in display order before said group of picture data to which said reproduction point belongs and writes decoded group of picture data in display order before said group of picture data to which said reproduction point belongs in said reproduction memory when said reproduction point is in the first half of said group of picture data to which said reproduction point belongs and decodes said group of picture data one position in display order after said group of picture data to which said reproduction point belongs and writes decoded group of picture data in display order after said group of picture data to which said reproduction point belongs in said reproduction memory when said reproduction point is in the second half of said group of picture data to which said reproduction point belongs.

9. A reproduction apparatus as set forth in claim 3, wherein
said decoder decodes said group of picture data to which said reproduction point belongs, said group of picture data one position in display order before said group of picture data to which said reproduction point belongs, and said group of picture data one position in display order after said group of picture data to which said reproduction point belongs.

10. A reproduction apparatus as set forth in claim 3, wherein
said decoder first decodes said group of picture data to which said reproduction point belongs and writes decoded group of picture data to which said reproduction point belongs in said reproduction memory, decodes said group of picture data one position in display order before said group of picture data to which said reproduction point belongs and writes decoded group of picture data one position in display order before said group of picture data to which said reproduction point belongs in said reproduction memory when said reproduction point is in the first half of said group of picture data to which said reproduction point belongs, and decodes said group of picture data one position in display order after said group of picture data to which said reproduction point belongs and writes decoded group of picture data one position in display order after said group of picture data to which said reproduction point belongs in said reproduction memory when said reproduction point is in the second half of said group of picture data to which said reproduction point belongs.

11. A computer making a reproduction apparatus decode and reproduce reproduced data, comprising:
- means for inputting a first command designating a reproduction point of reproduced data and a second command indicating start of reproduction of said reproduction point designated by said first command after inputting said first command;
- means for outputting to said reproduction apparatus a group of picture data one position in display order before a group of picture data to which said reproduction point belongs when said reproduction point is at a first half of said group of picture data to which said reproduction point belongs and outputs to said reproduction apparatus a group of picture data one position in display order after said group of picture data to which said reproduction point belongs when said reproduction point is at a second half of said group of picture data to which said reproduction point belongs; and
- a processing circuit to make the reproduction apparatus output and decode data required for reproduction of said reproduction point in said reproduced data when said first command is input and outputting a reproduction start command to said reproduction apparatus and making it reproduce and output said decoding results when said second command is input.

12. A reproduction method comprising:
- outputting, from a computer to a reproduction apparatus, data required for reproduction of a reproduction point in reproduced data when inputting a first command designating said reproduction point of said reproduced data;
- decoding, at said reproduction apparatus, data of said reproduction point based on said data received from said computer;
- storing decoding results in a reproduction memory;
- outputting, at said computer, a group of picture data one position in display order before a group of picture data to which said reproduction point belongs when said reproduction point is at a first half of said group of picture data to which said reproduction point belongs and outputs to said reproduction apparatus a group of picture data one position in display order after said group of picture data to which said reproduction point belongs when said reproduction point is at a second half of said group of picture data to which said reproduction point belongs;
- outputting, at said computer, a reproduction start command of said reproduction point to said reproduction apparatus when inputting a second command indicating the start of reproduction of said reproduction point designated by said first command after inputting said first command; and
- reading, reproducing, and outputting, at said reproduction apparatus, the decoding results of said reproduction point from said reproduction memory based on said reproduction start command.

13. A reproduction method performed by a reproduction apparatus provided with an input memory for storing data required for production of a reproduction point in reproduced data and a reproduction memory, comprising:
- receiving, at said reproduction apparatus, input data including a group of picture data one position in display order before a group of picture data to which said reproduction point belongs when said reproduction point is at a first half of said group of picture data to which said reproduction point belongs and receives a group of picture data one position in display order after said group of picture data to which said reproduction point belongs when said reproduction point is at a second half of said group of picture data to which said reproduction point belongs;
- writing, at said reproduction apparatus, said input data into said input memory,
- reading, at said reproduction apparatus, said data input at said first step from said input memory, decoding said reproduction point, and writing the decoding results in said reproduction memory, and
- reading, reproducing, and outputting, at the reproduction apparatus, the decoding results of said reproduction point written in said reproduction memory at said second step based on the input reproduction start command indicating said reproduction point.

14. A non-transitory storage medium encoded with instructions, which when executed by a data processing system including a computer and a reproduction apparatus, causes said data processing system to implement a method comprising:
- outputting, from the computer to the reproduction apparatus, data required for reproduction of a reproduction point in reproduced data when inputting a first command designating said reproduction point of said reproduced data;
- outputting, from the computer to the reproduction apparatus, a group of picture data one position in display order before a group of picture data to which said reproduction point belongs when said reproduction point is at a first half of said group of picture data to which said reproduction point belongs and outputs to said reproduction apparatus a group of picture data one position in display order after said group of picture data to which said reproduction point belongs when said reproduction point is at a second half of said group of picture data to which said reproduction point belongs; and
- decoding, at said reproduction apparatus, data of said reproduction point based on said data received from said compute;
- storing decoding results in a reproduction memory; and
- outputting, at said computer, a reproduction start command of said reproduction point to said reproduction apparatus when inputting a second command indicating the start of reproduction of said reproduction point designated by said first command after inputting said first command.

15. A non-transitory storage medium encoded with instruction, which when executed by a reproduction apparatus provided with an input memory for storing data required for production of a reproduction point in reproduced data and a reproduction memory, causes said reproduction apparatus to implement a method comprising:
- receiving, at said reproduction apparatus, input data including a group of picture data one position in display order before a group of picture data to which said reproduction point belongs when said reproduction point is at a first half of said group of picture data to which said reproduction point belongs and receives a group of picture data one position in display order after said group of picture data to which said reproduction point belongs when said reproduction point is at a second half of said group of picture data to which said reproduction point belongs;
- writing, at said reproduction apparatus, said input data into said input memory,
- reading, at said reproduction apparatus, said data input from said input memory, decoding said reproduction point, and writing the decoding results in said reproduction memory, and reading, reproducing and outputting, at said reproduction apparatus, decoding results of said reproduction point written in said reproduction memory based on a reproduction start command indicating said reproduction point.

16. A data processing apparatus comprising:

a processor to output to a reproduction apparatus data required for reproduction of a reproduction point in reproduced data when receiving as input a first command designating said reproduction point of said reproduced data and outputting to said reproduction apparatus a reproduction start command for said reproduction point when receiving as input a second command indicating a start of reproduction of said reproduction point designated by said first command after receiving as input said first command, wherein said processor outputs to said reproduction apparatus a group of picture data one position in display order before said group of picture data to which said reproduction point belongs when said reproduction point is at a first half of said group of picture data to which said reproduction point belongs and outputs to said reproduction apparatus a group of picture data one position in display order after said group of picture data to which said reproduction point belongs when said reproduction point is at a second half of said group of picture data to which said reproduction point belongs.

* * * * *